(12) United States Patent
Judge et al.

(10) Patent No.: US 7,870,203 B2
(45) Date of Patent: Jan. 11, 2011

(54) METHODS AND SYSTEMS FOR EXPOSING MESSAGING REPUTATION TO AN END USER

(75) Inventors: Paul Judge, Alpharetta, GA (US); Dmitri Alperovitch, Atlanta, GA (US); Joel Joseph Caracciolo, North Bloomfield, OH (US); Alejandro Manuel Hernandez, Kennesaw, GA (US); Sven Krasser, Atlanta, GA (US); Phyllis Adele Schneck, Atlanta, GA (US)

(73) Assignee: McAfee, Inc., Santa Clara, CA (US)

( * ) Notice: Subject to any disclaimer, the term of this patent is extended or adjusted under 35 U.S.C. 154(b) by 978 days.

(21) Appl. No.: 11/423,329

(22) Filed: Jun. 9, 2006

(65) Prior Publication Data

US 2007/0027992 A1 Feb. 1, 2007

Related U.S. Application Data

(63) Continuation-in-part of application No. 11/173,941, filed on Jul. 1, 2005, which is a continuation-in-part of application No. 11/142,943, filed on Jun. 2, 2005, application No. 11/423,329, which is a continuation-in-part of application No. 11/383,347, filed on May 15, 2006, application No. 11/423,329, which is a continuation-in-part of application No. 11/218,689, filed on Sep. 2, 2005, now Pat. No. 7,089,590, which is a continuation of application No. 10/093,553, filed on Mar. 8, 2002, now Pat. No. 6,941,467, application No. 11/423,329, which is a continuation-in-part of application No. 10/094,211, filed on Mar. 8, 2002, now Pat. No. 7,458,098, and a continuation-in-part of application No. 10/094,266, filed on Mar. 8, 2002, now Pat. No. 7,124,438, and a continuation-in-part of application No. 10/361,091, filed on Feb. 7, 2003, now Pat. No. 7,096,498, and a continuation-in-part of application No. 10/373,325, filed on Feb. 24, 2003, now Pat. No. 7,213,260, and a continuation-in-part of application No. 10/361,067, filed on Feb. 7, 2003, now abandoned, and a continuation-in-part of application No. 10/384,924, filed on Mar. 6, 2003.

(60) Provisional application No. 60/625,507, filed on Nov. 5, 2004, provisional application No. 60/736,121, filed on Nov. 10, 2005.

(51) Int. Cl.
*G06F 15/16* (2006.01)
(52) U.S. Cl. .................. 709/206; 709/207; 709/201
(58) Field of Classification Search ................ 709/206, 709/227, 201
See application file for complete search history.

(56) References Cited

U.S. PATENT DOCUMENTS 4,289,930 A 9/1981 Connolly et al.

(Continued)

FOREIGN PATENT DOCUMENTS

CA 2564533 12/2005

(Continued)

OTHER PUBLICATIONS

Article entitled "An Example-Based Mapping Method for Text Categorization and Retrieval" by Yang et. al., in *ACM Transactions on Information Systems*, Jul. 1994, vol. 12, No. 3, pp. 252-277.

(Continued)

*Primary Examiner*—Djenane M Bayard
(74) *Attorney, Agent, or Firm*—Fish & Richardson P.C.

(57) ABSTRACT

Systems and methods for providing message reputation to an end user.

31 Claims, 15 Drawing Sheets

U.S. PATENT DOCUMENTS

| | | |
|---|---|---|
| 4,384,325 A | 5/1983 | Slechta et al. |
| 4,386,416 A | 5/1983 | Giltner et al. |
| 4,532,588 A | 7/1985 | Foster |
| 4,713,780 A | 12/1987 | Schultz et al. |
| 4,754,428 A | 6/1988 | Schultz et al. |
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,632,011 A | 5/1997 | Landfield et al. |
| 5,638,487 A | 6/1997 | Chigier |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,836 A | 4/1999 | Freivald et al. |
| 5,903,723 A | 5/1999 | Beck et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |

| | | |
|---|---|---|
| 6,035,423 A | 3/2000 | Hodges et al. |
| 6,052,709 A | 4/2000 | Paul |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |
| 6,108,691 A | 8/2000 | Lee et al. |
| 6,108,786 A | 8/2000 | Knowlson |
| 6,118,856 A | 9/2000 | Paarsmarkt et al. |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A | 12/2000 | Horvitz et al. |
| 6,185,689 B1 | 2/2001 | Todd, Sr. et al. |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,247,045 B1 * | 6/2001 | Shaw et al. ............... 709/207 |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,269,447 B1 | 7/2001 | Maloney et al. |
| 6,269,456 B1 | 7/2001 | Hodges et al. |
| 6,272,532 B1 | 8/2001 | Feinleib |
| 6,275,942 B1 | 8/2001 | Bernhard et al. |
| 6,279,113 B1 | 8/2001 | Vaidya |
| 6,279,133 B1 | 8/2001 | Vafai et al. |
| 6,282,565 B1 | 8/2001 | Shaw et al. |
| 6,285,991 B1 | 9/2001 | Powar |
| 6,289,214 B1 | 9/2001 | Backstrom |
| 6,298,445 B1 | 10/2001 | Shostack et al. |
| 6,301,668 B1 | 10/2001 | Gleichauf et al. |
| 6,304,898 B1 | 10/2001 | Shiigi |
| 6,304,973 B1 | 10/2001 | Williams |
| 6,311,207 B1 | 10/2001 | Mighdoll et al. |
| 6,317,829 B1 | 11/2001 | Van Oorschot |
| 6,320,948 B1 | 11/2001 | Heilmann et al. |
| 6,321,267 B1 | 11/2001 | Donaldson |
| 6,324,569 B1 | 11/2001 | Ogilvie et al. |
| 6,324,647 B1 | 11/2001 | Bowman-Amuah |
| 6,324,656 B1 | 11/2001 | Gleichauf et al. |
| 6,330,589 B1 | 12/2001 | Kennedy |
| 6,347,374 B1 | 2/2002 | Drake et al. |
| 6,353,886 B1 | 3/2002 | Howard et al. |
| 6,363,489 B1 | 3/2002 | Comay et al. |
| 6,370,648 B1 | 4/2002 | Diep |
| 6,373,950 B1 | 4/2002 | Rowney |
| 6,385,655 B1 | 5/2002 | Smith et al. |
| 6,393,465 B2 | 5/2002 | Leeds |
| 6,393,568 B1 | 5/2002 | Ranger et al. |
| 6,405,318 B1 | 6/2002 | Rowland |
| 6,442,588 B1 | 8/2002 | Clark et al. |
| 6,442,686 B1 | 8/2002 | McArdle et al. |
| 6,453,345 B2 | 9/2002 | Trcka et al. |
| 6,460,141 B1 | 10/2002 | Olden |
| 6,470,086 B1 | 10/2002 | Smith |
| 6,487,599 B1 | 11/2002 | Smith et al. |
| 6,487,666 B1 | 11/2002 | Shanklin et al. |
| 6,502,191 B1 | 12/2002 | Smith et al. |
| 6,516,411 B2 | 2/2003 | Smith |
| 6,519,703 B1 | 2/2003 | Joyce |
| 6,539,430 B1 | 3/2003 | Humes |
| 6,546,416 B1 | 4/2003 | Kirsch |
| 6,546,493 B1 | 4/2003 | Magdych et al. |
| 6,550,012 B1 | 4/2003 | Villa et al. |
| 6,574,737 B1 | 6/2003 | Kingsford et al. |
| 6,578,025 B1 | 6/2003 | Pollack et al. |
| 6,609,196 B1 | 8/2003 | Dickinson, III et al. |
| 6,650,890 B1 | 11/2003 | Irlam et al. |
| 6,654,787 B1 | 11/2003 | Aronson et al. |
| 6,675,153 B1 | 1/2004 | Cook et al. |
| 6,681,331 B1 | 1/2004 | Munson et al. |
| 6,687,687 B1 | 2/2004 | Smadja |
| 6,697,950 B1 | 2/2004 | Kouznetsov |
| 6,701,440 B1 | 3/2004 | Kim et al. |
| 6,704,874 B1 | 3/2004 | Porras et al. |
| 6,711,127 B1 | 3/2004 | Gorman et al. |
| 6,725,377 B1 | 4/2004 | Kouznetsov |
| 6,732,101 B1 | 5/2004 | Cook |
| 6,732,157 B1 | 5/2004 | Gordon et al. |
| 6,735,703 B1 | 5/2004 | Kilpatrick et al. |
| 6,738,462 B1 | 5/2004 | Brunson |
| 6,742,124 B1 | 5/2004 | Kilpatrick et al. |
| 6,742,128 B1 | 5/2004 | Joiner |
| 6,754,705 B2 | 6/2004 | Joiner et al. |
| 6,757,830 B1 | 6/2004 | Tarbotton et al. |
| 6,768,991 B2 | 7/2004 | Hearnden |
| 6,769,016 B2 | 7/2004 | Rothwell et al. |
| 6,775,657 B1 | 8/2004 | Baker |
| 6,792,546 B1 | 9/2004 | Shanklin et al. |
| 6,892,178 B1 | 5/2005 | Zacharia |
| 6,892,179 B1 | 5/2005 | Zacharia |
| 6,892,237 B1 | 5/2005 | Gai et al. |
| 6,895,385 B1 | 5/2005 | Zacharia et al. |
| 6,907,430 B2 | 6/2005 | Chong et al. |
| 6,910,135 B1 | 6/2005 | Grainger |
| 6,928,556 B2 | 8/2005 | Black et al. |
| 6,941,348 B2 | 9/2005 | Petry et al. |
| 6,941,467 B2 | 9/2005 | Judge et al. |
| 6,968,461 B1 | 11/2005 | Lucas et al. |
| 7,206,814 B2 * | 4/2007 | Kirsch ............... 709/206 |
| 2001/0049793 A1 | 12/2001 | Sugimoto |
| 2002/0004902 A1 | 1/2002 | Toh et al. |
| 2002/0013692 A1 * | 1/2002 | Chandhok et al. ............... 704/1 |
| 2002/0016910 A1 | 2/2002 | Wright et al. |
| 2002/0023140 A1 | 2/2002 | Hile et al. |
| 2002/0026591 A1 | 2/2002 | Hartley et al. |
| 2002/0032871 A1 | 3/2002 | Malan et al. |
| 2002/0035683 A1 | 3/2002 | Kaashoek et al. |
| 2002/0042876 A1 | 4/2002 | Smith |
| 2002/0046041 A1 | 4/2002 | Lang |
| 2002/0049853 A1 | 4/2002 | Chu et al. |
| 2002/0078382 A1 | 6/2002 | Sheikh et al. |
| 2002/0087882 A1 | 7/2002 | Schneier et al. |
| 2002/0095492 A1 | 7/2002 | Kaashoek et al. |
| 2002/0112185 A1 | 8/2002 | Hodges |
| 2002/0116627 A1 | 8/2002 | Tarbotton et al. |
| 2002/0120853 A1 | 8/2002 | Tyree |
| 2002/0133365 A1 | 9/2002 | Grey et al. |
| 2002/0138416 A1 | 9/2002 | Lovejoy et al. |
| 2002/0138755 A1 | 9/2002 | Ko |
| 2002/0138759 A1 | 9/2002 | Dutta |
| 2002/0138762 A1 | 9/2002 | Horne |
| 2002/0143963 A1 | 10/2002 | Converse et al. |
| 2002/0147734 A1 | 10/2002 | Shoup et al. |
| 2002/0152399 A1 | 10/2002 | Smith |
| 2002/0165971 A1 | 11/2002 | Baron |
| 2002/0169954 A1 | 11/2002 | Bandini et al. |
| 2002/0172367 A1 | 11/2002 | Mulder et al. |
| 2002/0178227 A1 | 11/2002 | Matsa et al. |
| 2002/0178383 A1 | 11/2002 | Hrabik et al. |

| | | | | | | |
|---|---|---|---|---|---|---|
| 2002/0188864 A1 | 12/2002 | Jackson | | 2004/0058673 A1 | 3/2004 | Irlam et al. |
| 2002/0194469 A1 | 12/2002 | Dominique et al. | | 2004/0059811 A1 | 3/2004 | Sugauchi et al. |
| 2002/0199095 A1 | 12/2002 | Bandini et al. | | 2004/0088570 A1 | 5/2004 | Roberts et al. |
| 2003/0005326 A1 | 1/2003 | Flemming | | 2004/0111531 A1 | 6/2004 | Staniford et al. |
| 2003/0009554 A1 | 1/2003 | Burch et al. | | 2004/0139160 A1 | 7/2004 | Wallace et al. |
| 2003/0009693 A1 | 1/2003 | Brock et al. | | 2004/0139334 A1 | 7/2004 | Wiseman |
| 2003/0009696 A1 | 1/2003 | Bunker et al. | | 2004/0177120 A1* | 9/2004 | Kirsch .................... 709/206 |
| 2003/0009699 A1 | 1/2003 | Gupta et al. | | 2004/0203589 A1 | 10/2004 | Wang et al. |
| 2003/0014664 A1 | 1/2003 | Hentunen | | 2004/0205135 A1 | 10/2004 | Hallam-Baker et al. |
| 2003/0023692 A1 | 1/2003 | Moroo | | 2004/0267893 A1 | 12/2004 | Lin |
| 2003/0023695 A1 | 1/2003 | Kobata et al. | | 2005/0021738 A1 | 1/2005 | Goeller et al. |
| 2003/0023873 A1 | 1/2003 | Ben-Itzhak | | 2005/0052998 A1 | 3/2005 | Oliver et al. |
| 2003/0023874 A1 | 1/2003 | Prokupets et al. | | 2005/0065810 A1 | 3/2005 | Bouron |
| 2003/0023875 A1 | 1/2003 | Hursey et al. | | 2005/0102366 A1 | 5/2005 | Kirsch |
| 2003/0028803 A1 | 2/2003 | Bunker et al. | | 2005/0262209 A1 | 11/2005 | Yu |
| 2003/0033516 A1 | 2/2003 | Howard et al. | | 2005/0262210 A1 | 11/2005 | Yu |
| 2003/0033542 A1 | 2/2003 | Goseva-Popstojanova et al. | | 2006/0031314 A1* | 2/2006 | Brahms et al. ............. 709/206 |
| 2003/0041264 A1 | 2/2003 | Black et al. | | 2006/0036727 A1 | 2/2006 | Kurapati et al. |
| 2003/0051026 A1 | 3/2003 | Carter et al. | | 2006/0042483 A1 | 3/2006 | Work et al. |
| 2003/0051163 A1 | 3/2003 | Bidaud | | 2006/0095404 A1 | 5/2006 | Adelman et al. |
| 2003/0051168 A1 | 3/2003 | King et al. | | 2006/0123083 A1 | 6/2006 | Goutte et al. |
| 2003/0055931 A1 | 3/2003 | Cravo De Almeida et al. | | 2006/0212925 A1 | 9/2006 | Shull et al. |
| 2003/0061506 A1 | 3/2003 | Cooper et al. | | 2006/0212930 A1* | 9/2006 | Shull et al. .................... 726/10 |
| 2003/0065943 A1 | 4/2003 | Geis et al. | | 2006/0212931 A1 | 9/2006 | Shull et al. |
| 2003/0084280 A1 | 5/2003 | Bryan et al. | | 2006/0230039 A1 | 10/2006 | Shull et al. |
| 2003/0084320 A1 | 5/2003 | Tarquini et al. | | 2006/0253458 A1 | 11/2006 | Dixon et al. |
| 2003/0084323 A1 | 5/2003 | Gales | | | | |
| 2003/0084347 A1 | 5/2003 | Luzzatto | | | FOREIGN PATENT DOCUMENTS | |
| 2003/0088792 A1 | 5/2003 | Card et al. | | EP | 0375138 A2 | 6/1990 |
| 2003/0093667 A1 | 5/2003 | Dutta et al. | | EP | 0413537 A2 | 2/1991 |
| 2003/0093695 A1 | 5/2003 | Dutta | | EP | 0420779 A2 | 4/1991 |
| 2003/0093696 A1 | 5/2003 | Sugimoto | | EP | 0720333 A2 | 7/1996 |
| 2003/0095555 A1 | 5/2003 | McNamara et al. | | EP | 0838774 A2 | 4/1998 |
| 2003/0097439 A1 | 5/2003 | Strayer et al. | | EP | 0869652 A2 | 10/1998 |
| 2003/0097564 A1 | 5/2003 | Tewari et al. | | EP | 0907120 A2 | 4/1999 |
| 2003/0105976 A1 | 6/2003 | Copeland, III | | EP | 1326376 | 7/2003 |
| 2003/0110392 A1 | 6/2003 | Aucsmith et al. | | EP | 1271846 | 7/2005 |
| 2003/0110396 A1 | 6/2003 | Lewis et al. | | GB | 2271002 A | 3/1994 |
| 2003/0115485 A1 | 6/2003 | Milliken | | JP | 18350870 | 12/2006 |
| 2003/0115486 A1 | 6/2003 | Choi et al. | | KR | 2006-0012137 | 2/2006 |
| 2003/0123665 A1 | 7/2003 | Dunstan et al. | | KR | 1020060041934 | 5/2006 |
| 2003/0126464 A1 | 7/2003 | McDaniel et al. | | WO | WO 96/35994 A1 | 11/1996 |
| 2003/0126472 A1 | 7/2003 | Banzhof | | WO | WO 99/05814 A2 | 2/1999 |
| 2003/0135749 A1 | 7/2003 | Gales et al. | | WO | WO 99/33188 A2 | 7/1999 |
| 2003/0140137 A1 | 7/2003 | Joiner et al. | | WO | WO 99/37066 A1 | 7/1999 |
| 2003/0140250 A1 | 7/2003 | Taninaka et al. | | WO | WO 00/42748 A1 | 7/2000 |
| 2003/0145212 A1 | 7/2003 | Crumly | | WO | WO 01/17165 A2 | 3/2001 |
| 2003/0145225 A1 | 7/2003 | Bruton, III et al. | | WO | WO 01/50691 A2 | 7/2001 |
| 2003/0145226 A1 | 7/2003 | Bruton, III et al. | | WO | WO 01/76181 A2 | 10/2001 |
| 2003/0149887 A1 | 8/2003 | Yadav | | WO | WO 02/13469 A2 | 2/2002 |
| 2003/0149888 A1 | 8/2003 | Yadav | | WO | WO 02/13489 A2 | 2/2002 |
| 2003/0154393 A1 | 8/2003 | Young | | WO | WO 02/75547 A1 | 9/2002 |
| 2003/0154399 A1 | 8/2003 | Zuk et al. | | WO | WO 02/091706 A1 | 11/2002 |
| 2003/0154402 A1 | 8/2003 | Pandit et al. | | WO | WO 2004/061703 | 7/2004 |
| 2003/0158905 A1 | 8/2003 | Petry et al. | | WO | WO 2004081734 | 9/2004 |
| 2003/0159069 A1 | 8/2003 | Choi et al. | | WO | WO 2005116851 | 12/2005 |
| 2003/0159070 A1 | 8/2003 | Mayer et al. | | | | |
| 2003/0167402 A1 | 9/2003 | Stolfo et al. | | | | |
| 2003/0172166 A1 | 9/2003 | Judge et al. | | | OTHER PUBLICATIONS | |

Article entitled "A Comparison of Two Learning Algorithms for Text Categorization" by Lewis et al., in *Third Annual Symposium on Document Analysis and Information Retrieval*, Apr. 11-13, 1994, pp. 81-92.

Article entitled "Learning Limited Dependence Bayesian Classifiers" by Sahami, in *Proceedings of the Second International Conference on Knowledge Discovery and Data Mining*, pp. 335-338.

Article entitled "An Evaluation of Phrasal and Clustered Representations on a Text Categorization Task" by Lewis, in 15th *Ann Int'l SIGIR*, Jun. 1992, pp. 37-50.

Book entitled *Machine Learning* by Mitchell, 1997, pp. 180-184.

Article entitled "Learning Rules that Classify E-mail" by Cohen, pp. 1-8. Date unknown.

| | | | |
|---|---|---|---|
| 2003/0172167 A1 | 9/2003 | Judge et al. | |
| 2003/0172289 A1 | 9/2003 | Soppera | |
| 2003/0172291 A1 | 9/2003 | Judge et al. | |
| 2003/0172292 A1 | 9/2003 | Judge | |
| 2003/0172294 A1 | 9/2003 | Judge | |
| 2003/0172301 A1 | 9/2003 | Judge et al. | |
| 2003/0172302 A1 | 9/2003 | Judge et al. | |
| 2003/0187936 A1* | 10/2003 | Bodin et al. ................ 709/206 |
| 2003/0187996 A1 | 10/2003 | Cardina et al. | |
| 2003/0212791 A1 | 11/2003 | Pickup | |
| 2003/0233328 A1 | 12/2003 | Scott et al. | |
| 2004/0015554 A1 | 1/2004 | Wilson | |
| 2004/0025044 A1 | 2/2004 | Day | |
| 2004/0054886 A1 | 3/2004 | Dickinson et al. | |

Article entitled "Hierarchically classifying documents using very few words" by Koller et. al., in *Proceedings of the Fourteenth International Conference on Machine Learning*, 1997.
Article entitled "Classification of Text Documents" by Li et. al., in *The Computer Journal*, vol. 41, No. 8, 1998, pp. 537-546.
Article entitled "Issues when designing filters in messaging systems" by Palme et. al., in 19 *Computer Communications*, 1996, pp. 95-101.
Article entitled "Text Categorization with Support Vector Machines: Learning with Many Relevant Features" by Joachins in *Machine Learning: ECML*-98, Apr. 1998, pp. 1-14.
Article entitled "Hierarchical Bayesian Clustering for Automatic Text Classification" by Iwayama et al. in *Natural Language*, pp. 1322-1327. Date unknown.
Article entitled "Smokey: Automatic Recognition of Hostile Messages" by Spertus in *Innovative Applications* 1997, pp. 1058-1065.
Article entitled "A Comparison of Classifiers and Document Representations for the Routing Problem" by Schutze. Date unknown.
Article entitled "Cafe: A Conceptual Model for Managing Information in Electronic Mail" by Takkinen et al. in *Proc. 31st Annual Hawaii International Conference on System Sciences*, 1998, pp. 44-53.
Article entitled "A Comparative Study on Feature Selection in Text Categorization" by Yang et. al. Date unknown.
Article entitled "Spam!" by Cranor et. al. in *Communications Of The ACM*, vol. 41, No. 8, Aug. 1998, pp. 74-83.
Article entitled "Sendmail and Spam" by LeFebvre in *Performance Computing*, Aug. 1998, pp. 55-58.
Article entitled "Implementing a Generalized Tool for Network Monitoring" by Ranum et. al. in *LISA XI*, Oct. 26-31, 1997, pp. 1-8.
Article entitled "Method for Automatic Contextual Transposition Upon Receipt of item of Specified Criteria" printed Feb. 1994 in *IBM Technical Disclosure Bulletin*, vol. 37, No. 2B, p. 333.
Article entitled "Toward Optimal Feature Selection" by Koller et al., in *Machine Learning: Proc. of the Thirteenth International Conference*, 1996.
Website: Technical Focus—Products—Entegrity AssureAccess. www2.entegrity.com.
Website: Create Secure Internet Communication Channels—Atabok Homepage. www.atabok.com.
Website: ATABOK VCNMAIL™ Secure Email Solution—Atabok Related Produces. www.atabok.com.
Website: ATABOK VCN Auto-Exchange™ —Atabok Related Produces. www.atabok.com.
Website: Controlling Digital Assets Is a Paramount Need for All Business—Atabok Related Produces. www.atabok.com.
Website: Control Your Confidential Communications with ATABOK—Atabok Related Produces. www.atabok.com.
Website: Entrust Entelligence—Entrust Homepage. www.entrust.com.
Website: E-mail Plug-in—Get Technical/Interoperability—Entrust Entelligence. www.entrust.com.
Website: E-mail Plug-in—Get Technical/System Requirements—Entrust Entelligence. www.entrust.com.
Website: E-mail Plug-in—Features and Benefits—Entrust Entelligence. www.entrust.com.
Website: Internet Filtering Software—Internet Manager Homepage. www.elronsw.com.
Website: ESKE—Email with Secure Key Exchange—ESKE. www.danu.ie.
Website: Terminet—ESKE. www.danu.ie.
Website: Baltimore Focus on e-Security—Baltimore Technologies. www.baltimore.com.
Website: Go Secure! for Microsoft Exchange—Products/Services—Verisign, Inc. www.verisign.com.
Article entitled "MIMEsweeper defuses virus network, 'net mail bombs" by Avery, in *info World*, May 20, 1996, vol. 12, No. 21, p. N1.
Article entitled "Stomping out mail viruses" by Wilkerson, in *PC Week*, Jul. 15, 1996, p. N8.
Article entitled "Securing Electronic Mail Systems" by Serenelli et al., in *Communications-Fusing Command Control and Intelligence: MILCOM '92* 1992, pp. 677-680.
Article entitled "Integralis' Minesweeper defuses E-mail bombs" by Kramer et. al., in *PC Week*, Mar. 18, 1996, p. N17-N23.
Article entitled "A Toolkit and Methods for Internet Firewalls" by Ranum et. al., in *Proc. of USENIX Summer 1994 Technical Conference* Jun. 6-10, 1994, pp. 37-44.
Article entitled "Firewall Systems: The Next Generation" by McGhie, in *Integration issues in Large Commerical Media Delivery Systems: Proc. of SPIE-The International Society for Optical Engineering*, Oct. 23-24, 1995, pp. 270-281.
Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.
Article entitled "Designing an Academic Firewall: Policy, Practice, and Experience with SURF" by Greenwald et. al., in *Proc. of the 1996 Symposium on Network and Distributed Systems Security*, 1996, pp. 1-14.
Article entitled "X Through the Firewall, and Other Application Relays" by Tresse et. al. in *Proc. of the USENIX Summer 1993 Technical Conference*, Jun. 21-25, 1993, pp. 87-99.
Article entitled "Firewalls For Sale" by Bryan, in *BYTE*, Apr. 1995, pp. 99-104.
Article entitled "A DNS Filter and Switch for Packett-filtering Gateways" by Cheswick et al., in *Proc. of the Sixth Annual USENIX Security Symposium: Focusing on Applications of Cryptography*, Jul. 22-25, 1996, pp. 15-19.
Article entitled "Safe Use of X Window System Protocol Across A Firewall" by Kahn, in *Proc. of the Fifth USENIX UNIX Security Symposium*, Jun. 5-7, 1995, pp. 105-116.
Article entitled "Automating the OSI to Internet Management Conversion Through the Use of an Object-Oriented Platform" by Pavlou et al., in *Proc. of the IFIP TC6/WG6.4 International Conference on Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security* Mar. 14-16, 1996, pp. 11-18.
Memo entitled "SOCKS Protocol Version 5" by Leech et. al., in *Standards Track*, Mar. 1996, pp. 1-9.
Article entitled "Securing the Web: fire walls, proxy, servers, and data driven attacks" by Farrow in *InfoWorld*, Jun. 19, 1995, vol. 17, No. 25, p. 103.

* cited by examiner

| | $P_{NR}$ (Probability of Non-Reputable Sender) | | | | | | | | | | |
|---|---|---|---|---|---|---|---|---|---|---|---|
| | | 0.0 | 0.1 | 0.2 | 0.3 | 0.4 | 0.5 | 0.6 | 0.7 | 0.8 | 0.9 | 1.0 |
| $P_R$ (Probability of Reputable Sender) | 0.0 | 0 | 3 | 5 | 8 | 5 | 4 | 4 | 10 | 27 | 65 | 140 |
| | 0.1 | -3 | 0 | 2 | 3 | 3 | 3 | 5 | 12 | 28 | 62 | 126 |
| | 0.2 | -5 | -2 | 0 | 1 | 2 | 3 | 5 | 11 | 24 | 53 | 106 |
| | 0.3 | -8 | -3 | -1 | 0 | 1 | 2 | 4 | 9 | 20 | 43 | 85 |
| | 0.4 | -5 | -3 | -2 | -1 | 0 | 1 | 3 | 7 | 16 | 33 | 66 |
| | 0.5 | -4 | -3 | -3 | -2 | -1 | 0 | 2 | 5 | 12 | 25 | 50 |
| | 0.6 | -4 | -5 | -5 | -4 | -3 | -2 | 0 | 3 | 8 | 18 | 37 |
| | 0.7 | -10 | -12 | -11 | -9 | -7 | -5 | -3 | 0 | 5 | 13 | 27 |
| | 0.8 | -27 | -28 | -24 | -20 | -16 | -12 | -8 | -5 | 0 | 7 | 18 |
| | 0.9 | -65 | -62 | -53 | -43 | -33 | -25 | -18 | -13 | -7 | 0 | 10 |
| | 1.0 | -140 | -126 | -106 | -85 | -66 | -50 | -37 | -27 | -18 | -10 | 0 |

FIG. 9

METHODS AND SYSTEMS FOR EXPOSING MESSAGING REPUTATION TO AN END USER

CROSS-REFERENCE TO RELATED APPLICATIONS

This application claims priority to and the benefit of U.S. application Ser. No. 11/173,941, entitled "MESSAGE PROFILING SYSTEMS AND METHODS," filed on Jul. 1, 2005, which is a continuation in part of, and claims priority to and benefits of U.S. application Ser. No. 11/142,943, entitled "SYSTEMS AND METHODS FOR CLASSIFICATION OF MESSAGING ENTITIES," filed on Jun. 2, 2005, both of which claim priority to and the benefit of U.S. Provisional Application Ser. No. 60/625,507, entitled "Classification of Messaging Entities," filed on Nov. 5, 2004, all of which are incorporated herein be reference.

This application is also a continuation-in-part of and claims priority to and the benefit of commonly assigned U.S. patent application Ser. No. 11/383,347, filed May 15, 2006, entitled "CONTENT-BASED POLICY COMPLIANCE SYSTEMS AND METHODS," which claims priority to U.S. Provisional Applications No. 60/736,121, filed Nov. 10, 2005, both of which are incorporated herein by reference.

This application is a continuation in part of and claims priority to and the benefit of commonly assigned U.S. patent application Ser. No. 11/218,689, entitled "SYSTEMS AND METHODS FOR ADAPTIVE MESSAGE INTERROGATION THROUGH MULTIPLE QUEUES," filed Sep. 2, 2005, which is a continuation of U.S. patent application Ser. No. 10/093,553, entitled "SYSTEMS AND METHODS FOR ADAPTIVE MESSAGE INTERROGATION THROUGH MULTIPLE QUEUES," filed Mar. 8, 2002, now U.S. Pat. No. 6,941,467, both of which are incorporated herein by reference. This application is also a continuation in part of and claims priority to and the benefit of commonly assigned U.S. patent application Ser. No. 10/094,211, entitled "SYSTEMS AND METHODS FOR ENHANCING ELECTRONIC COMMUNICATION SECURITY," and U.S. patent application Ser. No. 10/094,266, entitled "SYSTEMS AND METHODS FOR ANOMALY DETECTION IN PATTERNS OF MONITORED COMMUNICATIONS," both of which were filed on Mar. 8, 2002 and are incorporated herein by reference.

This application is also a continuation in part of and claims priority to and the benefit of commonly assigned U.S. patent application Ser. No. 10/361,091, filed Feb. 7, 2003, entitled "SYSTEMS AND METHODS FOR MESSAGE THREAT MANAGEMENT," U.S. patent application Ser. No. 10/373,325, filed Feb. 24, 2003, entitled "SYSTEMS AND METHODS FOR UPSTREAM THREAT PUSHBACK," U.S. patent application Ser. No. 10/361,067 filed Feb. 7, 2003, entitled "SYSTEMS AND METHODS FOR AUTOMATED WHITELISTING IN MONITORED COMMUNICATIONS," and U.S. patent application Ser. No. 10/384,924, filed Mar. 6, 2003, entitled "SYSTEMS AND METHODS FOR SECURE COMMUNICATION DELIVERY." The entire disclosure of all of these applications is incorporated herein by reference.

This application is also related to co-pending U.S. patent application Ser. No. 11/423,308 entitled "SYSTEMS AND METHODS FOR GRAPHICALLY DISPLAYING MESSAGING TRAFFIC," and U.S. patent application Ser. No. 11/423,313 entitled "SYSTEMS AND METHODS FOR IDENTIFYING POTENTIALLY MALICIOUS MESSAGES," both filed on Jun. 9, 2006. The entire disclosure of each of these applications is incorporated herein by reference.

TECHNICAL FIELD

This invention relates to electronic messaging classification, and more particularly to alerting a user to a messaging classification.

BACKGROUND AND SUMMARY

This document relates generally to systems and methods for processing communications and more particularly to systems and methods for filtering communications.

In the anti-spam industry, spammers use various creative means for evading detection by spam filters. Available anti-spam systems include fail-open systems in which all incoming messages are filtered for spam. However, these systems can be inefficient and inaccurate in Properly classifying messages at legitimate or spam.

In accordance with the teachings disclosed herein, methods and systems are provided for operation upon one or more data processors that classify communications from messaging entities. For example, a method and system can include receiving a communication that was sent from a messaging entity. A plurality of message classification techniques is used to classify the communication. A message classification technique is associated with a confidence value which is used in generating a message classification output from the message classification technique. The message classification outputs are combined in order to generate a message profile score. The message profile score is used in deciding what action is to be taken with respect to the communication associated with the messaging entity.

As another example, a system and method can utilize a plurality of message classification techniques, wherein the plurality of message classification techniques are configured to classify a communication received from a messaging entity. Message profiling logic can be configured to combine the message classification outputs in order to generate a message profile score. The message profile score is used in deciding what action is to be taken with respect to the communication associated with the messaging entity.

As another example, a system and method can be used for tuning message classification parameters for use by one or more message classification techniques. A plurality of input data is received (such as through input logic or processing instructions) that is or is representative of a plurality of communications. A tuner program is used to tune the message classification parameters associated with the message classification techniques. A communication is received from a messaging entity. The tuned message classification parameters are used by the plurality of message classification techniques to classify the communication. Message classification outputs from the plurality of message classification techniques are combined in order to generate a message profile score. The message profile score is used in deciding what action is to be taken with respect to the communication associated with the messaging entity.

BRIEF DESCRIPTION OF THE DRAWINGS

FIG. 9 is a table depicting reputation scores at various calculated probability values.

DETAILED DESCRIPTION

Figure 1:
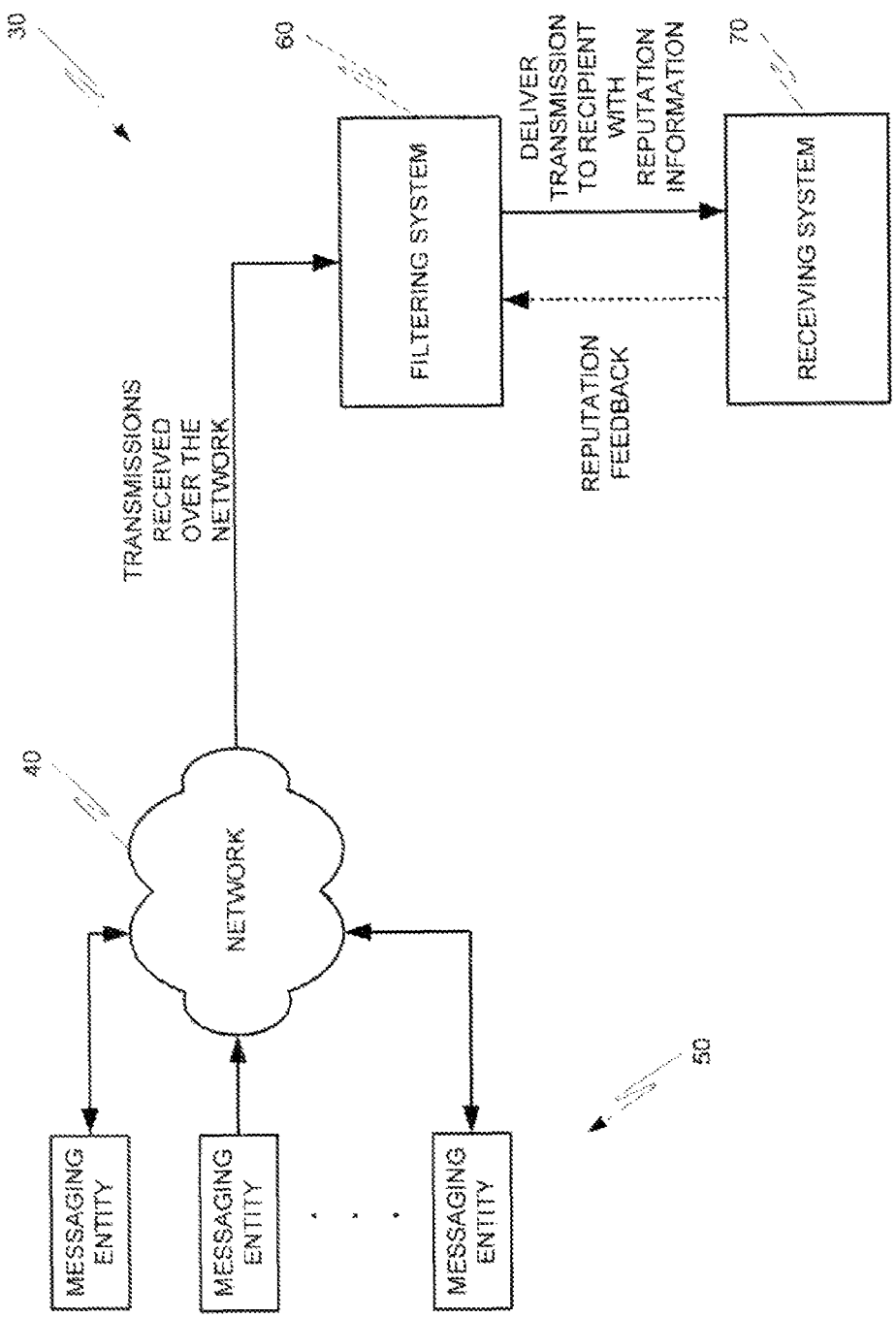
FIG. 1 is a block diagram depicting a system for handling transmissions received over a network.

FIG. 1 depicts at 30 a system for handling transmissions received over a network 40. The transmissions can be many different types of communications, such as electronic mail (e-mail) messages sent from one or more messaging entities 50. The system 30 uses a filtering system 60 to help process the communications from the messaging entities 50. The filtering system 60 examines characteristics associated with the communications from the messaging entities 50, and based upon the examination, an action is taken with respect to the communications. For example, a communication may be determined to be legitimate and thus the communication should not be filtered by the filtering system 60 and instead provided to a receiving system 70 for delivery to the intended recipient.

Figure 2:
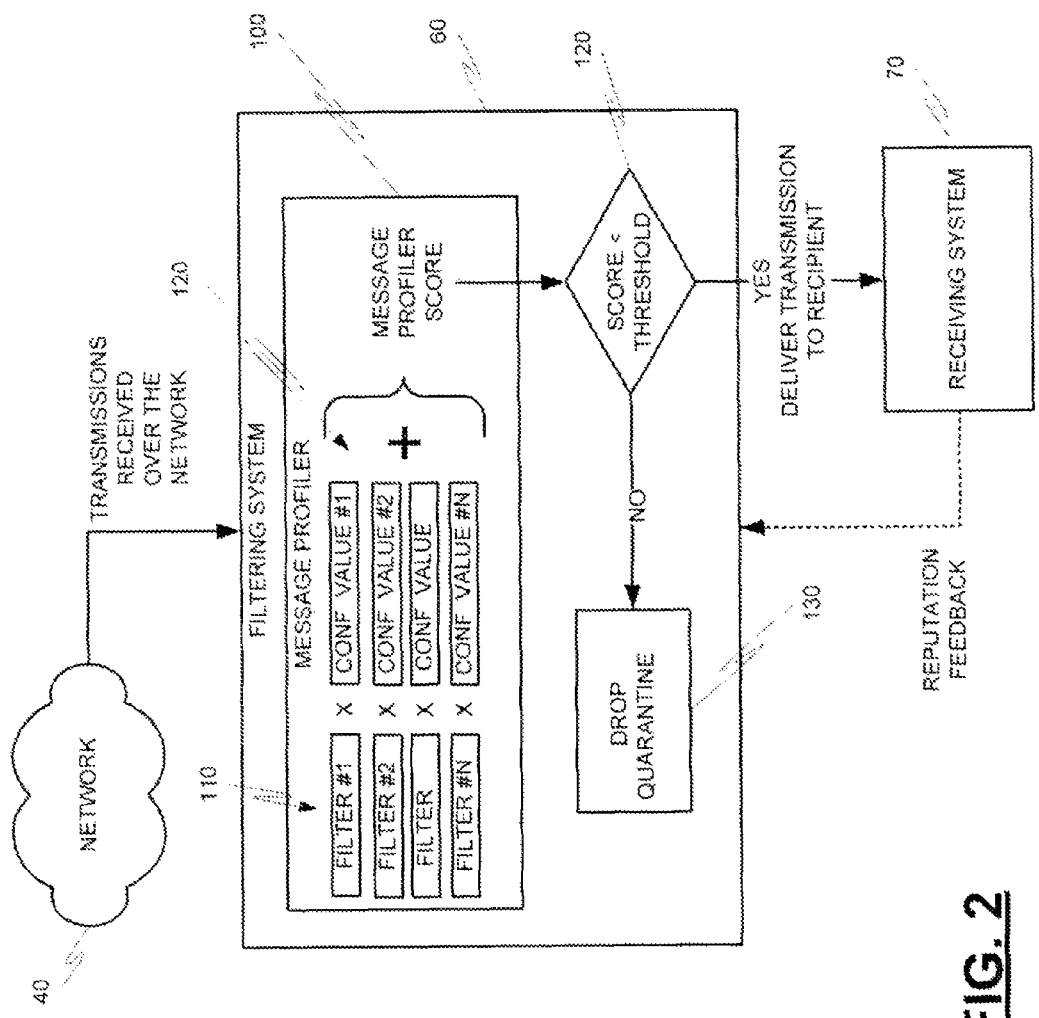
FIG. 2 is a block diagram depicting a filtering system having a message profiler program.

To increase the accuracy of classifying messages properly (e.g., as spam or legitimate), a filtering system 60 can be configured with a message profiler program 100 as shown in FIG. 2. A message profiler 100 uses multiple message classification techniques or filters 110 to classify messages as shown in FIG. 2. Example message classification techniques or filters 110 that a message profiler 100 can use include:

Reverse DNS (RDNS)—a classification technique that performs a reverse domain name service (DNS) lookup, based on the message sender's IP address, to check (1) whether a domain exists in the DNS system for that IP address, and (2) if such a domain exists, whether the domain matches the domain from which the sender claims to be sending the message.

Real-time Black-hole Lists (RBLs)—a classification technique that performs one or more real-time black-hole list (RBL) queries, based on the message sender's IP address, to check whether the IP address has been identified by any RBLs as an IP address that is likely to send unwanted messages.

Reputation Server—a classification technique that performs one or more reputation server queries, based on the message sender's IP address and/or their domain name and other message sender characteristics, to receive a score that describes the sender's reputation.

Signature/fingerprinting-based Analysis (e.g., Statistical Lookup Service (SLS))—a classification technique that computes a set of message hashes and queries a centralized statistical lookup service (SLS) to determine how frequently the computed message hashes have been seen in recent mail flow.

Message Header Analysis Classification Technique—as examples, this technique can include System Defined Header analysis (SDHA), User Defined Header Analysis (UDHA), etc.

System Defined Header Analysis (SDHA)—a set of classification techniques that examine a message and identify whether the message's headers exhibit certain system-defined characteristics that tend to identify likely unwanted message senders.

User Defined Header Analysis (UDHA)—a set of classification techniques that examine a message and identify whether the message's headers exhibit certain user-defined characteristics that tend to identify likely unwanted message senders.

Sender Authentication—a set of classification techniques that perform lookups to determine (1) whether the sender's claimed domain has published a record of mail servers that are authorized to send mail for that domain, and (2) if such a record has been published, whether the record authorizes the sender's IP address to send mail on behalf of the claimed domain. Examples of commonly used Sender Authentication techniques include Sender Policy Framework (SPF) and Sender ID.

Bayesian Filtering—a statistical classification technique that computes an estimate of the joint conditional probability that a message falls into a specific category, based on the set of textual tokens (words) in the message.

Content Filtering—a classification technique that searches the contents of a message for words that have been associated with certain message categories.

Clustering Classification—a classification technique that based upon measuring similarity among features, communications are clustered into such groups as desired, undesired (e.g., spam), etc. The clustering is performed such that intra-group similarities are high and inter-group similarities are low.

The list is not intended to be exhaustive, and can be adapted to include other techniques as they are discovered. Some of the descriptions in the list constitute a single technique, while others constitute a combined set of many similar or closely related techniques. In cases where multiple techniques are described collectively, the message profiler 100 permits each technique to have its own confidence value.

A message profiler 100 classifies messages using a threshold-based technique. Each of the classification techniques 110 used by the message profiler 100 has an associated confidence value 120. When a message arrives for profiling, the message profiler 100 iterates through the classification techniques and allows each technique to attempt to classify the message. The result of each classification is a decimal value in the range [0,1]. After iterating through each classification technique, the message profiler 100 computes a score for the message using the following formula:

$$\text{Score} = \sum_{i=1}^{N} SV_i C_i$$

where $SV_i$ is the confidence value associated with classification technique i, and $C_i$ is the classification value in [0,1] produced by classification technique i.

In using classification techniques with non-linear scoring functions, the following formula can be used:

$$\text{Score} = \sum_{i=1}^{N} SV_{1i} \times C_i + SV_{2i} \times C_i^2$$

where $SV_{1i}$ and $SV_{2i}$ are the confidence value associated with classification technique i, and $C_i$ is the classification value in [0,1] produced by classification technique i.

If the message score exceeds some specified threshold T as determined at 120, then the message is declared to belong to the first defined category. If the message score is below the threshold, it is declared to belong to the opposite category. The system can then take an appropriate action based on the threshold reached by the message score, such as quarantining the message, dropping the message (i.e., deleting the message without delivery as shown at 130), rewriting the subject of the message to contain some specific string (e.g., "SUSPECTED SPAM"), passing on a message to the encryption engine for secure delivery, etc. The system can also allow for specifying multiple thresholds and applying a different action or actions at each threshold, which would signify the increased confidence of the message profiler 100 in the result of the classification.

In another example, in accordance with systems and methods disclosed herein, the message reputation or classification may be make available to the user. The user can view this information, and critically evaluate the message in view of the reputation or classification. For example, a message including an indication alerting the recipient that the message is potential spam, can enable the user to avoid the message, or to open the message with a critical eye towards verifying that the message reputation was scored and classified correctly. Messages that are not properly scored may be returned to a message reputation system or process for use in reevaluating the criteria and/or weightings applied to incoming messages as described above. Exposing the message reputation or classification to the recipient could facilitate user input to message reputation scoring algorithms.

In one example, a header associated with a message can be added to or amended by a message profiler 100 such that it includes a message reputation or classification. The header would indicate to the recipient a reputation or classification associated with the message. As noted above, the reputation or classification could be noted by a message in the subject line of the message reading, for example, "SUSPECTED SPAM." It should be recognized, however, that there are many ways to communicate this information to a message recipient, or recipients. For example, a notification in the message header may be used by a messaging client or messaging server as a trigger to mark the message in some way. Other examples include color coding a message by changing the color of the message font to identify its reputation or classification to the user. Similarly, an inbox message list could be color coded to identify reputation of the messages. By way of this example, a message could be colored, for example, red to indicate that the message has a poor reputation score or classification. In the same way, a message could be colored, for example, yellow to indicate that the message reputation score or classification is borderline, or green to indicate that the message reputation score or classification is good. In yet further examples, a reputation score could be represented by a spectrum of colors, with intensity of a reputation score being indicated by an intense color coding.

The effectiveness and accuracy of a message profiler 100 is dependent on several factors, such as on the set of $SV_i$ or $SV_{1i}/SV_{2i}$ confidence value 120 associated with the classification techniques 110. A tunable message classification configuration can be used to generate an optimized set of values along with an associated set of thresholds and actions and that can be generated periodically to keep a message profiler 100 updated with the latest protection against the frequent changes in the score distributions of classification techniques operating on the constantly changing message flow patterns. As such, a message profiler configuration includes a vector $$SV_1, SV_2, \ldots, SV_N)$$

(which represents the confidence values of all N classification techniques).

Figure 3:
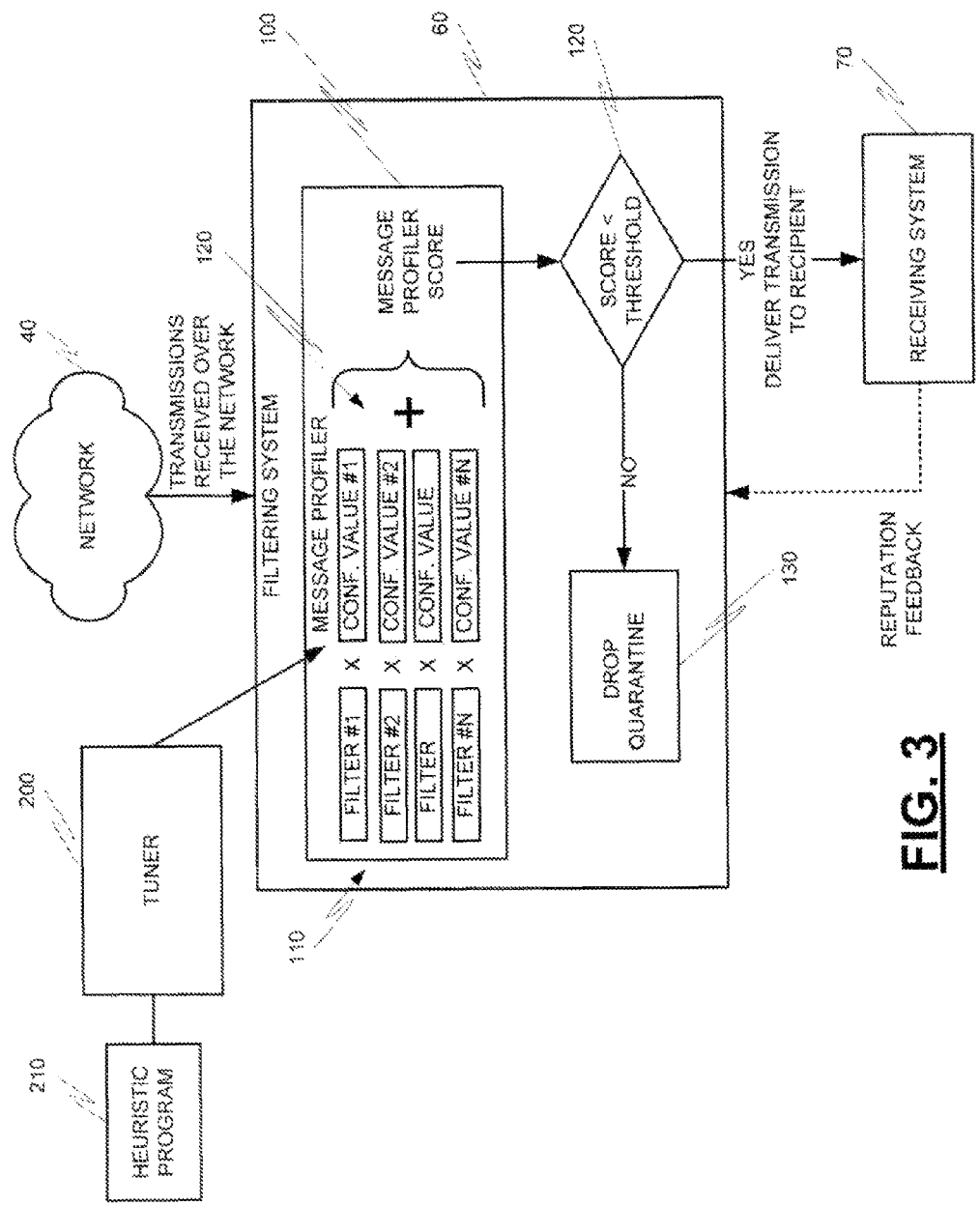
FIG. 3 is a block diagram depicting a message classification tuner program.

As shown in FIG. 3, a message classification tuner program 200 can be configured to tune a message profiler 100 by performing a probabilistic search through the vector space of all possible vectors and identifying a vector that maximizes the filtering accuracy of the profiler for a pre-selected threshold. The tuner 200 can use different approaches to do this, such as by using a heuristic approach 210.

Figure 4:
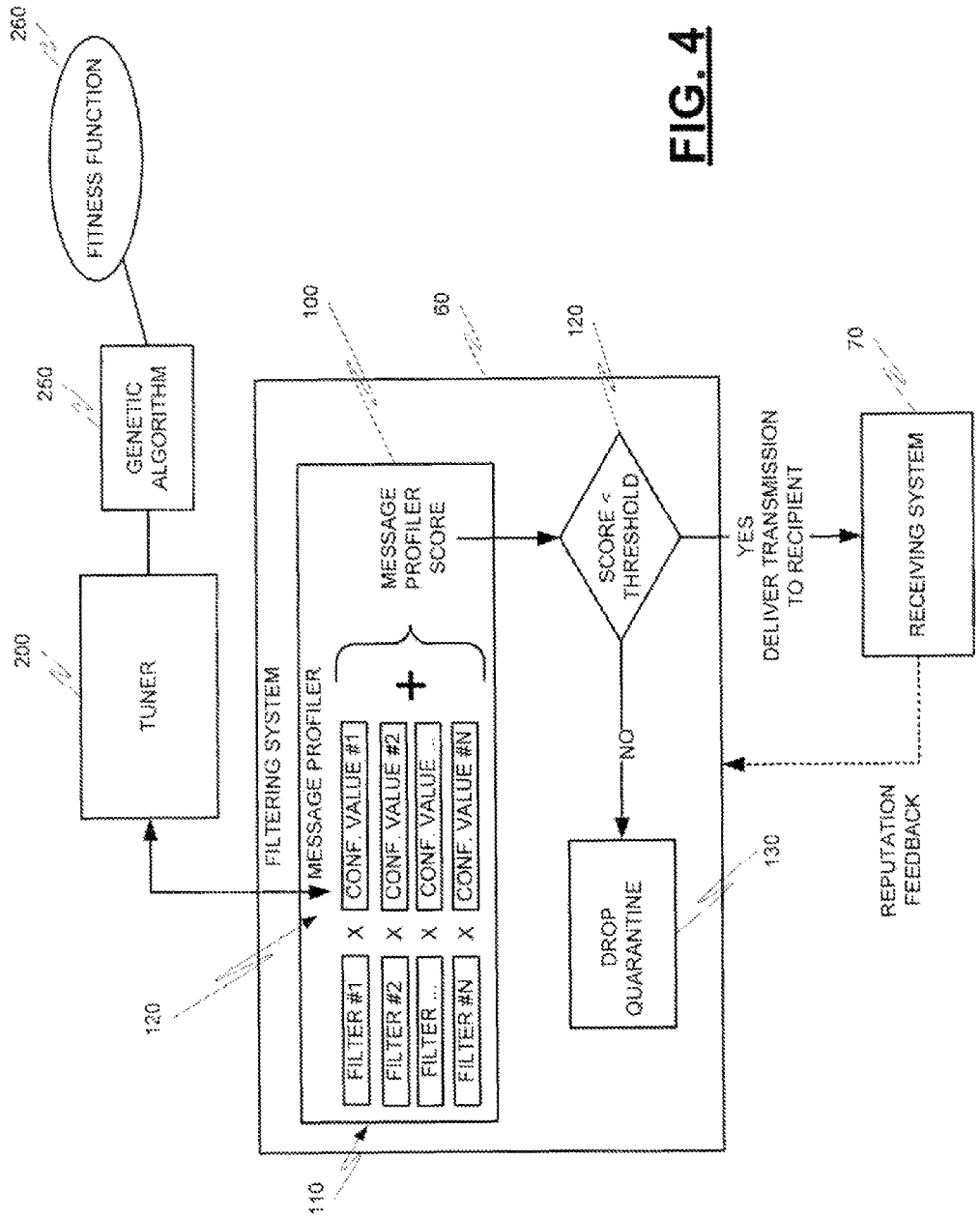
FIG. 4 is a block diagram depicting use of a genetic algorithm as a message classification tuner program.

FIG. 4 illustrates the tuner using a heuristic approach known as a genetic algorithm 250 in order to perform a vector space search. The concepts underpinning a genetic algorithm come from the theory of evolution, in which genotypes (expressed via chromosomes) compete with each other via their phenotypes (expressed as biological organisms). Over time, biological evolution produces highly adapted and complex organisms that are capable of surviving in the environment for which they evolved. Similarly, a genetic algorithm searches through a vector space consisting of candidate solutions to a problem, where each candidate solution is expressed as a vector. Over many simulated generations of candidate solutions, the genetic algorithm gradually evolves towards increasingly well-adapted solutions to the problem.

The genetic algorithm's ability to evolve good solutions to a problem over time depends upon the existence of an accurate mechanism for evaluating the relative fitness level of a candidate solution compared to other candidate solutions. Thus, the genetic algorithm 250 is designed with a fitness function 260 that accurately models the fitness of candidate solutions in the actual problem domain.

Below is a fitness function 260 that could be used for optimization of a message profiler 100:

$$\text{Fitness} = \frac{\sum |S_{CAT1\_MISTAKESi} - T|}{N_{CAT1}} + C \times \frac{\sum |S_{CAT1\_MISTAKESj} - T + 1|}{N_{CAT2}}$$

The definitions of terms in the function are as follows:
$N_{CAT1}$=number of message vectors from the overall data set that belong to the first category
$N_{CAT2}$=number of message vectors from the overall data set that belong to the second category C=constant multiplier for misclassified messages from the second category $S_{CAT1\_MISTAKE}$=message profiler score of message vector i from the first message category that has been misclassified to belong in the other category $S_{CAT2\_MISTAKE}$=message profiler score of message vector i from the second message category that has been misclassified to belong in the other category T=message profiler numeric threshold above which a message is considered to belong to the first category The function expresses the cost associated with the mistakes that a configuration made in attempting to correctly classify message vectors in the set of pre-classified data. Accordingly, a lower fitness value is considered better for the genetic algorithm's purposes. The first term in the function expresses the cost associated with messages from the first category that have been misclassified to belong in the second (e.g., unwanted messages that have been classified as legitimate, also known as false negatives), and the second term expresses the cost associated with messages from the second category that have been misclassified to belong in the first (e.g., legitimate messages that have been classified as unwanted, also known as false positives). The summations represent the total number of points by which a configuration was wrong when attempting to classify message vectors. Intuitively, each term is essentially an expression of both the average frequency of classification errors and the average magnitude of classification errors. Note that the second term is to be multiplied by a constant, C. This constant (which can be set to a value of 20) represents the relative cost of a misclassification of a message from one category in relation to misclassification of a message from the opposing category. By setting C to 20, this indicates that classification mistakes on messages from the second category are 20 times more costly than mistakes from the second category. For example, if a message profiler 100 is used for classification of wanted and unwanted mail, the first category would represent the unwanted mail (e.g., spam) and the second category would represent legitimate messages. Then the above function would deem misclassifications of legitimate messages (false positives) to be 20 times as costly as misclassification of unwanted messages (false negatives). This reflects the real-world view in the anti-spam community that false positives carry much higher risk than false negatives. If a message profiler 100 is used for policy compliance-related classification, a false positive is a message that contains sensitive information but is not labeled as such by the message profiler 100 and is, therefore, allowed to evade the policies that an organization may have chosen to apply to that particular category.

Figure 5:
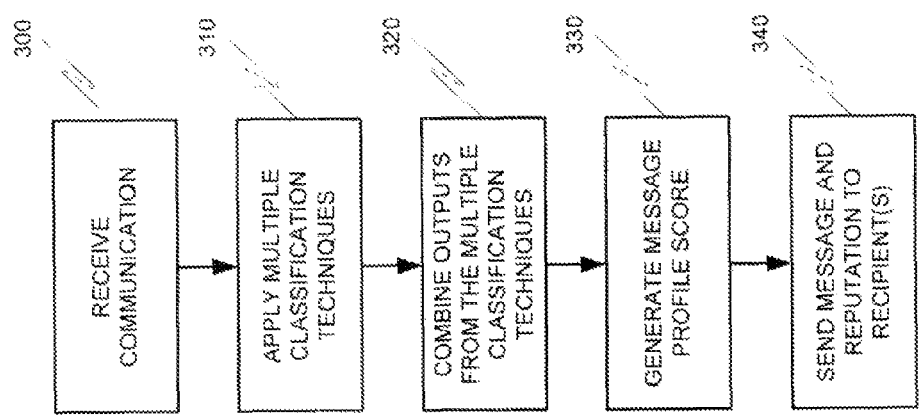
FIG. 5 is a flowchart depicting an operational scenario wherein a message profiler is used.

FIG. 5 depicts an operational scenario wherein a message profiler can be used. With reference to FIG. 5, the operational scenario includes receiving at step 310 a communication that was sent over a network from a messaging entity. A plurality of message classification techniques is then used at 310 to classify the communication. Each message classification technique is associated with a confidence value which is used in generating a message classification output from the message classification technique. The output of each classification can be numeric values, textual values, or categorical values. The message classification outputs are combined at step 320 in order to generate a message profile score at step 330. The message profile score is used at step 340 to decide what action is to be taken with respect to the communication associated with the message entity.

It should be understood that similar to the other processing flows described herein, the processing and the order of the processing may be altered, modified and/or augmented and still achieve the desired outcome. For example, a message profiler may be configured for an operational scenario that recognizes that there is a single technique is not capable of adequately classifying a message into two distinct categories, such as distinguishing between wanted (legitimate) and unwanted (spam, phishing, viruses, etc) message communications or determining whether a message complies with a specific organization policy, law, or regulation. In this operational scenario, such a configured message profiler can be designed to:

1. Provide a framework for combining the results of many message classification techniques into an aggregate classification (such as "unwanted" or "legitimate", "HIPPA compliant", "GLBA violation", "HR policy violation", etc), without specifying a priori which classification technique(s) will be used.
2. Decouple each classification technique's importance (expressed via its contribution towards the aggregate classification) from its classification logic, so that a technique's level of importance may be adjusted to reflect changes in its accuracy over time.
3. Provide a mechanism through which to describe the relative importance of each classification technique within the framework and the correlation of their individual accuracy, so that the framework can be adjusted to use this information to achieve very accurate rates in aggregate classification.
4. Provide a mechanism through which to discover the relative importance of each classification technique within the framework, so that the framework can be "tuned" for maximum classification accuracy in a given environment.

Figure 6:
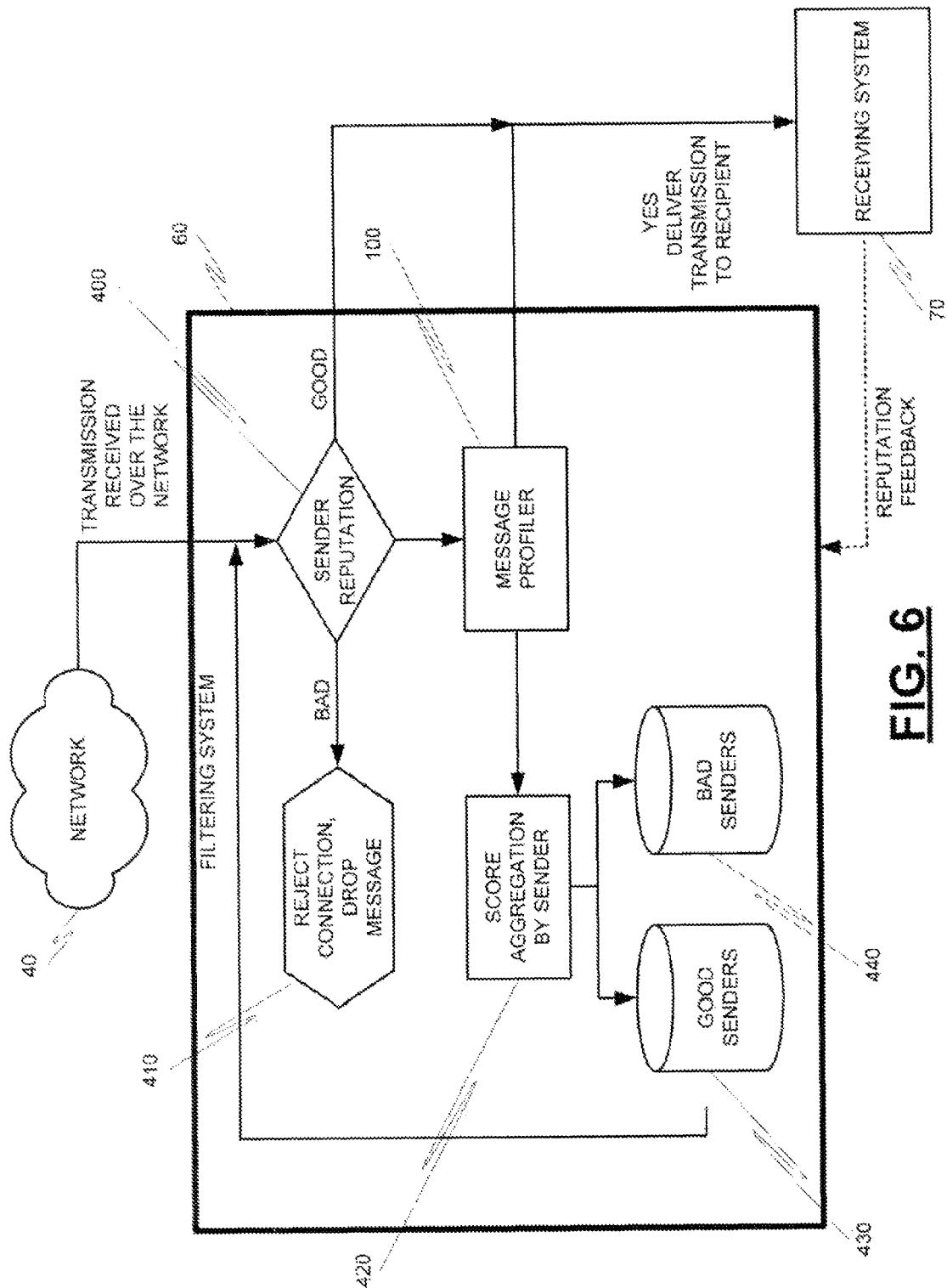
FIG. 6 is a block diagram depicting a message profiler that has been adapted to operate with an adaptive message blocking and whitelisting.

Still further, a message profiler may be configured to operate in other operational scenarios. For example, FIG. 6 depicts a message profiler that has been adapted to operate with adaptive message blocking and whitelisting. With reference to FIG. 6, in addition to classification of individual messages, the aggregated results of a message profiler program 100 can also be used for classifying at 420 senders of messages based on the distributions of message profiler scores that their messages are receiving. If the average score of messages received from a particular sender (e.g., IP) during a specified timeframe (e.g., hour, day, week) exceeds a specified threshold $T_U$ and the score distribution has a standard deviation smaller than $ST_U$, that sender can be classified 'un-reputable' (which information is stored in data store 440) process 400 can then use the data from data store 440 to determine that all messages and connections originating from such a sender can be dropped at 410 without processing for the next X hours. Correspondingly, if the average score is below threshold $T_L$ with a standard deviation smaller than $ST_L$, the sender can be considered legitimate (which information is stored in data store 430) and messages from that sender can be allowed by process 400 to bypass certain filtering techniques (e.g., the filtering of message profiler 100) that can cause significant processing, network, or storage overhead for the filtering system 60.

A message profiler may also be used in connection with adaptive training of endo and exo-filtering systems. Using the systems and methods of sender classifier described herein, a message profiler can be used for training of the various filtering techniques that are used within the profile, as well as others that lie completely outside of it. Such techniques may include Bayesian, Support Vector Machine (SVM) and other statistical content filtering techniques, as well as signature-based techniques such as Statistical Lookup Service (SLS) and message clustering-type techniques. The training strategies for such techniques may use sets of classified legitimate and unwanted messages, which can be provided by the message profiler based on sender reputations, assigned form the aggregate scores of messages from such senders. Messages from senders classified as un-reputable can be provided to the filtering system trainer as unwanted, and the wanted messages will be taken from stream sent by the legitimate senders.

Figure 7:
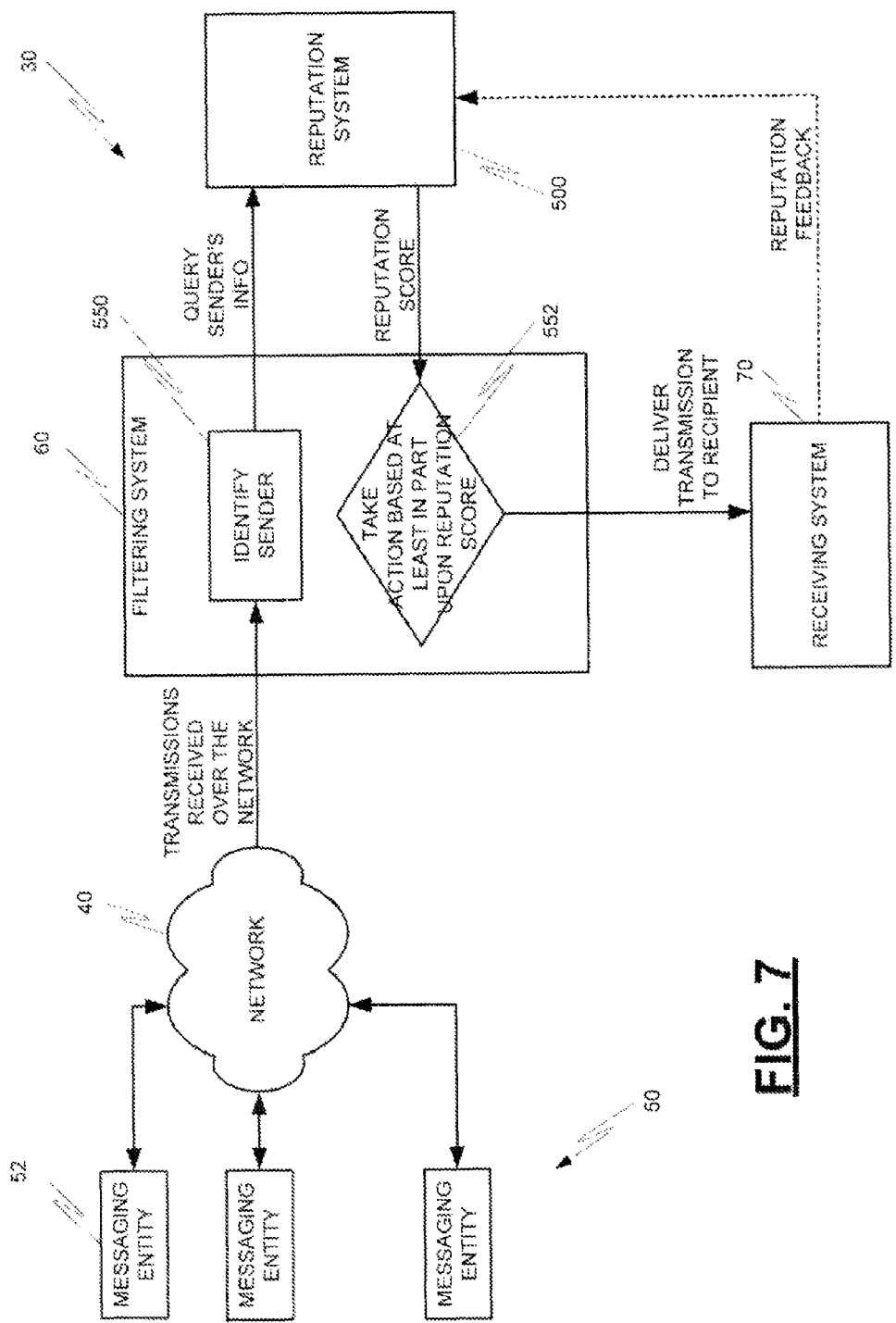
FIG. 7 is a block diagram depicting a reputation system for handling transmissions received over a network.

As described above, a message profiler 100 may use a reputation-based approach as on classification technique. FIG. 7 depicts at 500 a reputation system that can be used by a filtering system 60 in handling transmissions received over a network 40 from messaging entities 50. More specifically, the filtering system 60 uses the reputation system 500 to help determine (at least in part) what filtering action (if any) should be taken upon the messaging entities' communications. For example, the communication may be determined to be from a reputable source and thus the communication should not be filtered.

The filtering system 60 identifies at 550 the sender of a received communication and provides that identification information to the reputation system 500. The reputation system 500 evaluates the reputation of the queried sender's identity by calculating probabilities that a messaging entity exhibits certain characteristics. An overall reputation score is determined based upon the calculated probabilities and is provided to the filtering system 60. A reputation score can be numeric, textual, or categorical in value.

The filtering system 60 determines at 552 what action should be taken for the sender's communication. The filtering system 60 could use the reputation score from the reputation system 500 as a message classification filter which is to be multiplied by its respectively tuned confidence value and then aggregated with other message classification filter results.

Figure 8:
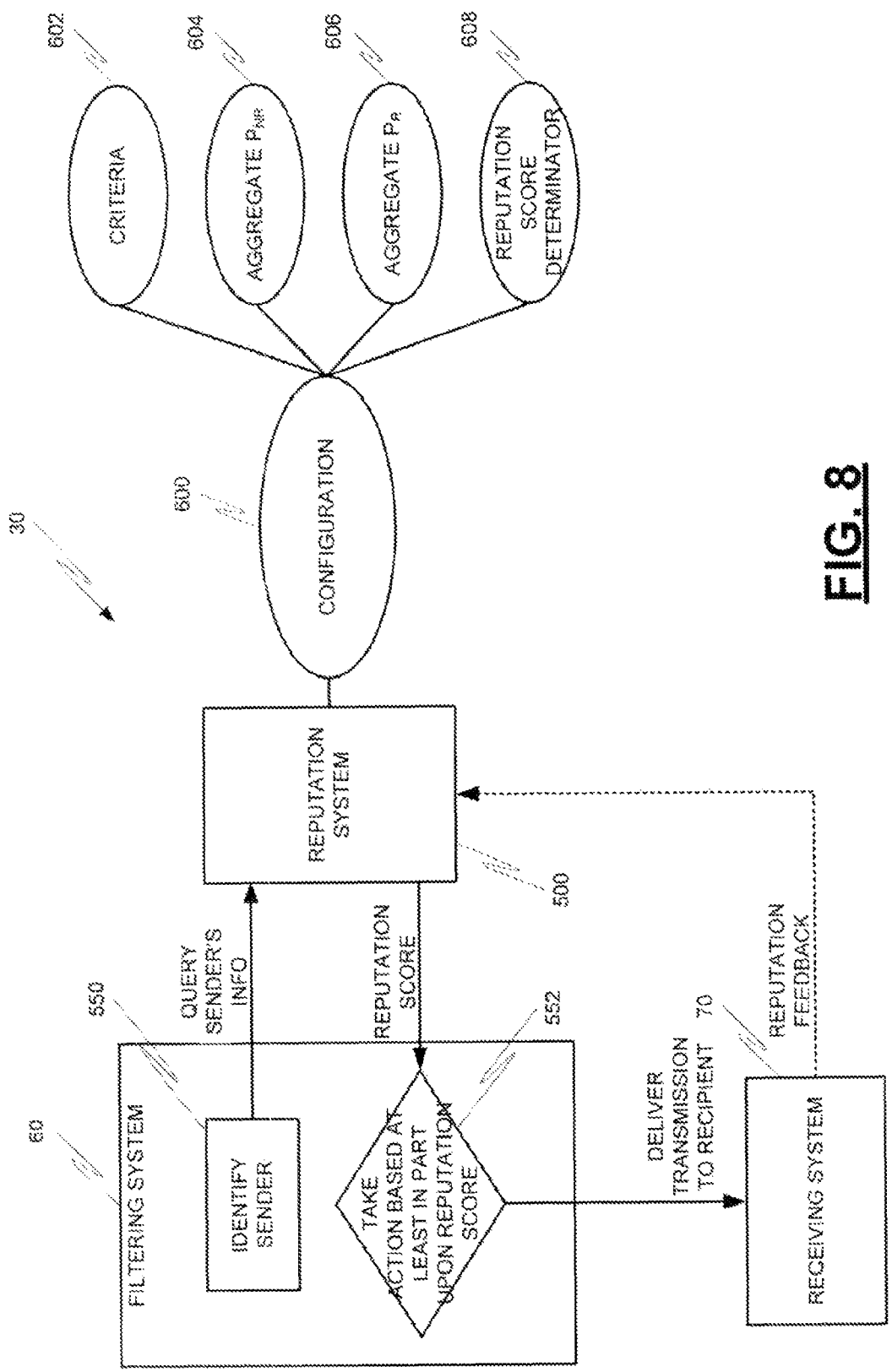
FIG. 8 is a block diagram depicting reputation system that has been configured for determining reputation scores.

Reputation systems may be configured in many different ways in order to assist a filtering system. For example, FIG. 8 depicts the reputation system 500 that has been configured to calculate reputation scores. The system's configuration 600 can be established by identifying a set of binary, testable criteria 602 which appear to be strong discriminators between good and bad senders. $P(NR|C_i)$ can be defined as the probability that a sender is non-reputable, given that it conforms to quality/criterion $C_i$, and $P(R|C_i)$ can be defined as the probability that a sender is reputable, given that it conforms to quality/criterion $C_i$.

For each quality criterion $C_i$, periodic (e.g., daily, weekly, monthly, etc.) sampling exercises can be performed to recalculate $P(NR|C_i)$. A sampling exercise may include selecting a random sample set S of N senders for which quality/criterion $C_i$ is known to be true. The senders in the sample are then sorted into one of the following sets; reputable (R), non-reputable (NR) or unknown (U). $N_R$ is the number of senders in the sample that are reputable senders, $N_{NR}$ is the number of senders that are non-reputable senders, etc. Then $P(NR|C_i)$ and $P(R|C_i)$ are estimated using the formulas:

$$P(R|C_i) = \frac{N_R}{N}$$

$$P(NR|C_i) = \frac{N_{NR}}{N}$$

For this purpose, N=30 was determined to be a large enough sample size to achieve an accurate estimate of $(NR|C_i)$ and $P(R|C_i)$ for each quality/criterion $C_i$.

After calculating $(NR|C_i)$ and $P(R|C_i)$ for all criteria, the computed probabilities are used to calculate an aggregate non-reputable probability 604, $P_{NR}$, and aggregate reputable sender probability 606, $P_R$, for each sender in the reputation space. These probabilities can be calculated using the formulas:

$$P_{NR} = \left(1 - \prod_{i=1}^{N} \left\{ \begin{array}{ll} 1 - P(R|C_i) & \text{if criterion } i \text{ applies} \\ 1 & \text{otherwise} \end{array} \right\} ^{\# \text{ of criteria that apply}} \right)$$

$$P_{NR} = \left(1 - \prod_{i=1}^{N} \left\{ \begin{array}{ll} 1 - P(NR|C_i) & \text{if criterion } i \text{ applies} \\ 1 & \text{otherwise} \end{array} \right\} ^{\# \text{ of criteria that apply}} \right)$$

In experimentation, the above formulas appeared to behave very well for a wide range of input criteria combinations, and in practice their behavior appears to be similar to the behavior of the formula for correctly computing naive joint conditional probabilities of "non-reputable" and "reputable" behavior for the input criteria.

After calculating $P_{NR}$ and $P_R$ for each sender, a reputation score is calculated for that sender using the following reputation function:

$$f(P_{NR}, P_R) = (c_1 + c_2 P_{NR} + c_2 P_R + c_3 P_{NR}^2 + c_3 P_R^2 + c_4 P_{NR} P_R + c_5 P_{NR}^3 + c_5 P_R^3 + c_6 P_{NR} P_R^2 c_6 P_{NR}^2 P_R) ((P_{NR} - P_R)^3 + c_7 (P_{NR} - P_R))$$

where
 $c_1$=86.50
 $c_2$=193.45
 $c_3$=35.19
 $c_4$=581.09
 $c_5$=234.81
 $c_6$=233.18
 $c_7$=0.51

It should be understood that different functions can act as a reputation score determinator 608 and can be expressed in many different forms in addition to a functional expression. As an illustration, FIG. 9 depicts at 700 a tabular form for determining reputation scores. The table shows reputation scores produced by the above function, based on values of $P_{NR}$ $P_R$ as they each vary between 0.0 and 1.0. For example as shown at 710, a reputation score of 53 is obtained for the combination of $P_{NR}$=0.9 and $P_R$=0.2. This reputation score is a relatively high indicator that the sender should not be considered reputable. A reputation score of 0 is obtained if $P_{NR}$ and $P_R$ are the same (e.g., the reputation score is 0 if $P_{NR}$=0.7 and $P_R$=0.7 as shown at 720). A reputation score can have a negative value to indicate that a sender is relatively reputable as determined when $P_R$ is greater than $P_{NR}$. For example, if $P_{NR}$=0.5 and $P_R$=0.8 as shown at 730, then the reputation score is −12.

Many different types of criteria may be used in a reputation system's processing of a sender's communication, such as using non-reputable criteria and reputable criteria to determine reputation scores. Examples of such criteria are disclosed in U.S. Provisional Application Ser. No. 60/625,507, entitled "CLASSIFICATION OF MESSAGING ENTITIES," filed on Nov. 5, 2004.

The systems and methods disclosed herein are presented only by way of example and are not meant to limit the scope of the invention. Other variations of the systems and methods described above will be apparent to those skilled in the art and as such are considered to be within the scope of the invention. For example, a system and method can be configured to handle many different types of communications, such as legitimate messages or unwanted communications or communications violative of a pre-selected policy. As an illustration, an unwanted communication could include a spam or virus communication, and a pre-selected policy could include a corporate communication policy, a messaging policy, a legislation or regulatory policy, or an international communication policy.

Figure 10:
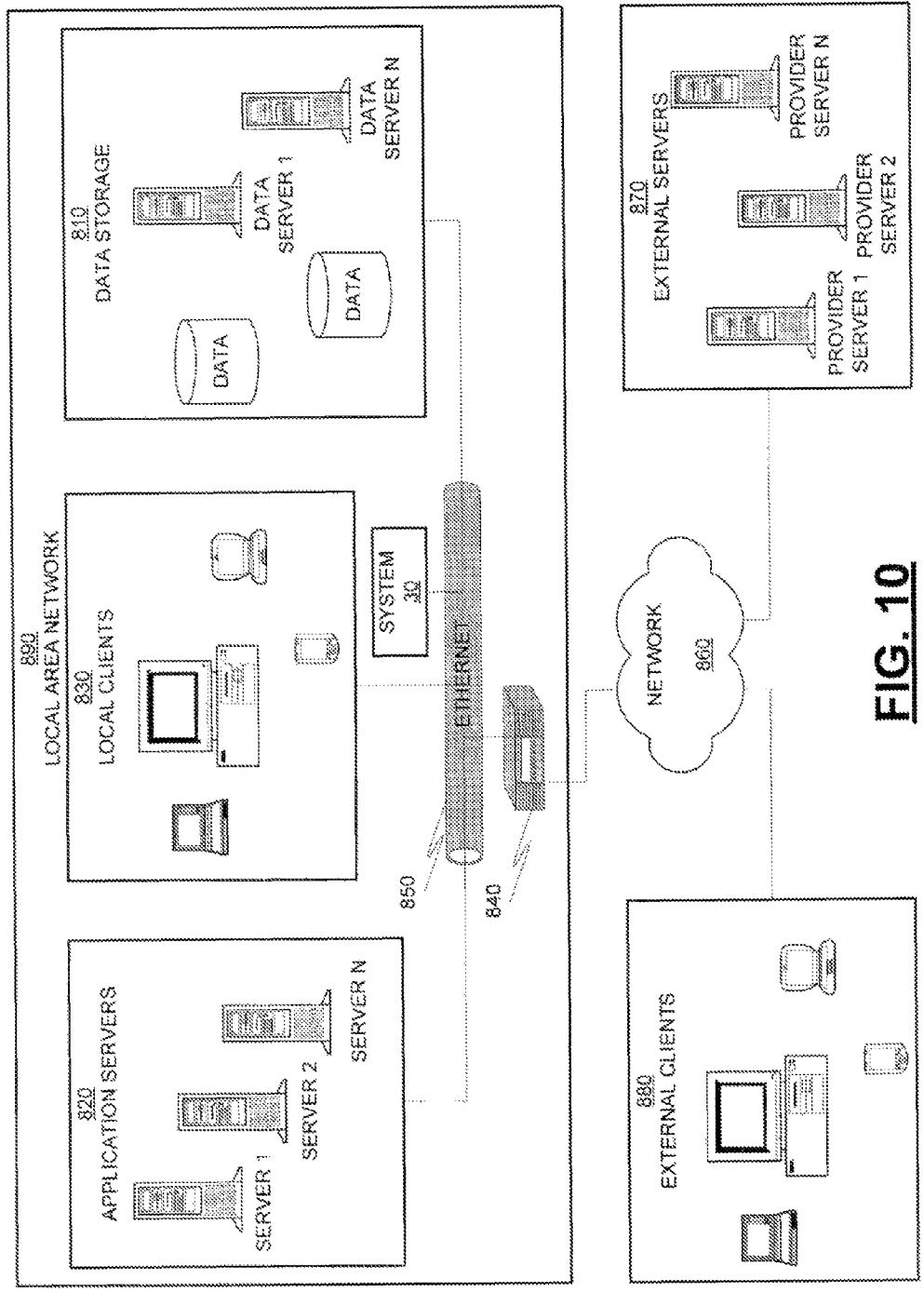
FIG. 10 is a block diagram depicting a server access architecture.

As another example of the wide scope and variations of the systems and methods disclosed herein, the systems and methods may be implemented on various types of computer architectures, such as for example on different types of networked environments. As an illustration, FIG. 10 depicts a server access architecture within which the disclosed systems and methods may be used (e.g., as shown at 30 in FIG. 10). The architecture in this example includes a corporation's local network 890 and a variety of computer systems residing within the local network 890. These systems can include application servers 820 such as Web servers and e-mail servers, user workstations running local clients 830 such as e-mail readers and Web browsers, and data storage devices 810 such as databases and network connected disks. These systems communicate with each other via a local communication network such as Ethernet 850. Firewall system 840 resides between the local communication network and Internet 860. Connected to the Internet 860 are a host of external servers 870 and external clients 880.

Local clients 830 can access application servers 820 and shared data storage 810 via the local communication network. Ethernet clients 880 can access external application servers 870 via the Internet 860. In instances where a local server 820 or a local client 830 requires access to an external server 870 or where an external client 880 or an external server 870 requires access to a local server 820, electronic communications in the appropriate protocol for a given application server flow through "always open" ports of firewall system 840.

A system 30 as disclosed herein may be located in a hardware device or on one or more servers connected to the local communication network such as Ethernet 880 and logically interposed between the firewall system 840 and the local servers 820 and clients 830. Application-related electronic communications attempting to enter or leave the local communications network through the firewall system 840 are routed to the system 30.

In the example of FIG. 10, system 30 could be configured to store and process reputation data about many millions of senders as part of a threat management system. This would allow the threat management system to make better informed decisions about allowing or blocking electronic mail (e-mail).

System 30 could be used to handle many different types of messaging and its variety of protocols that are used for messaging transmission, delivery and processing including, for example, among many others, SMTP and POP3. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, ad POP3 protocol is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent.

In addition, the IMAP protocol has evolved as an alternative to POP3 that supports more advanced interactions between e-mail servers and clients. This protocol is described in RFC 2060.

Other communication mechanisms are also widely used over networks. These communication mechanisms include, but are not limited to, Voice Over IP (VOIP) and Instant Messaging VoIP is used in IP telephony to provide a set of facilities for managing the delivery of voice information using the Internet protocol (IP). Instant Messaging is a type of communication involving a client which hooks up to an instant messaging service that delivers communications (e.g., conversations) in realtime.

As the Internet has become more widely used, it has also created new troubles for users. In particular, the amount of spam received by individual users has increased dramatically in the recent past. Spam, as used in this specification, refers to any communication receipt of which is either unsolicited or not desired by its recipient. A system and method can be configured as disclosed herein to address these types of unsolicited or undesired communications. This can be helpful in that e-mail spamming consumes corporate resources and impacts productivity.

It is further noted that the systems and methods disclosed herein may use data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems' and method' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

Figure 11:
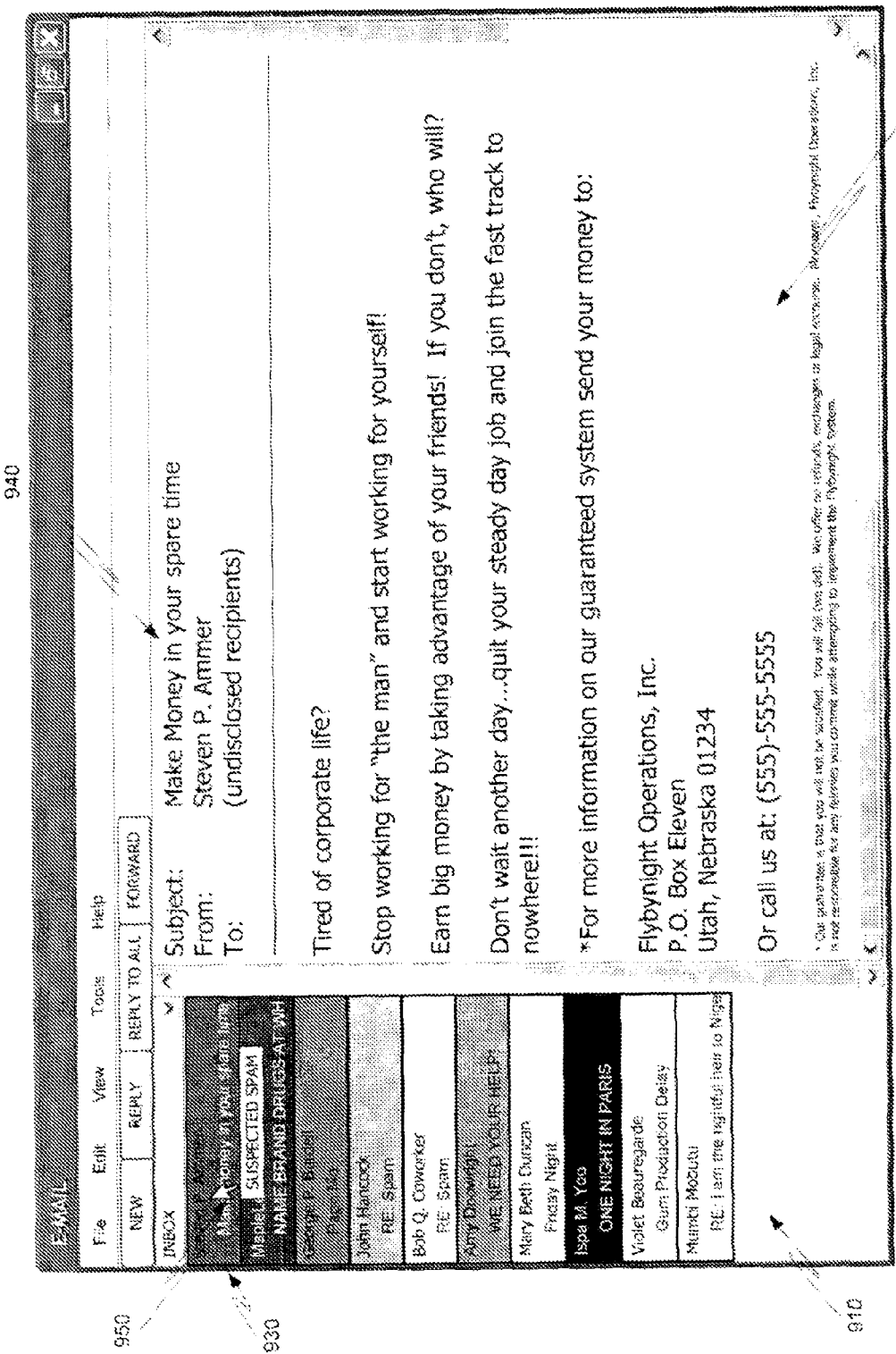
FIG. 11-13 are sample screen shot illustrations showing various examples of a messaging client interface.

FIG. 11 depicts an example of messaging client window representation 900 displaying a message reputation or classification to a user. The messaging client window representation 900 can include an inbox pane representation 910 and a preview pane representation 920. The inbox pane representation 910 can include a number of message representations 930. The preview pane representation 920 can include a message preview representation 940. In some examples, the message representations 930 include a color coding to indicate a reputation or classification associated with the message. In this example, the intensity of the gray scale relates to an intensity of the reputation score or classification. For example, darker grayscale (to black) indicates a higher confidence that the message is spam based upon the message reputation score. Lighter grayscale (to white) indicates a higher confidence that the message is not spam. It should be understood that these scales could be reversed in some examples, or different colors used. The e-mail client, in this example, could be programmed to display these colors to the user. It should also be noted, that similar methods of communicating this information could be applied to other messaging platforms, including, for example, instant messaging where the reputation of a user requesting a chat with can be pushed to a receiving user along with the chat request, or along with the username of the chat requester. In some examples, the messaging client can also be programmed such that when a cursor representation 950 is hovered over a message, a dialog box representation can display the reputation or classification of a message to highlight the reputation or classification associated with the color code assigned to the message.

Figure 12:
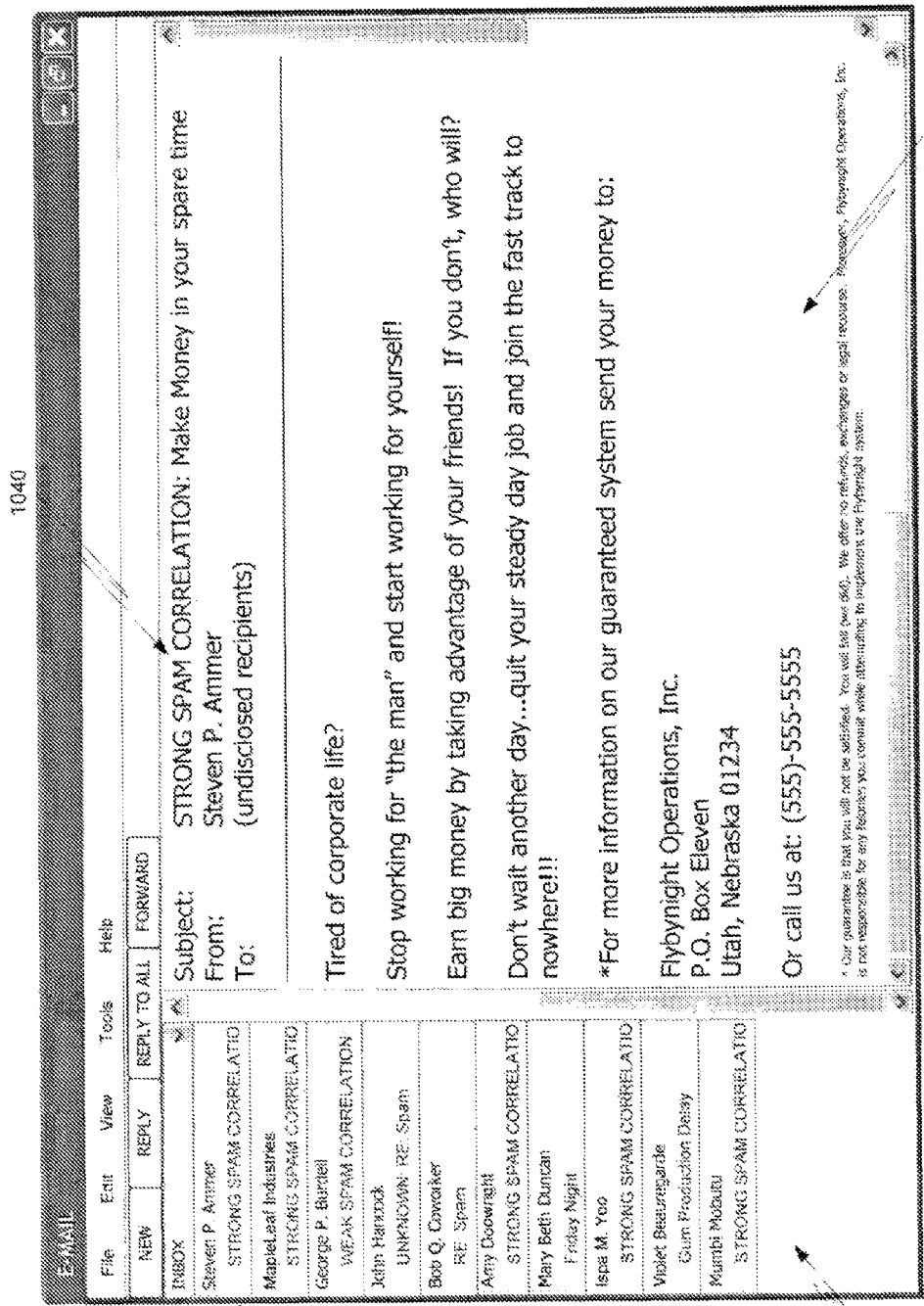

It should be understood that there are methods that can be used to push this information to the user without programming the messaging client to do so. For example, a reputation server could include the ability change the color of the font, or alter the display in some other way, in non-plain text messages. As another example, FIG. 12 depicts a messaging client window representation 1000 displaying a message reputation or classification to a user. The messaging client window representation 1000 includes an inbox pane representation 1010 and a message preview pane representation 1020. The inbox pane representation 1010 includes a list of messages 1030 associated with an inbox. In this example, text can be added to the header of the messages. Such text could include, for example, a note in the header stating one of "WEAK SPAM CORRELATION FOUND," "MYSTERIOUS," OR "STRONG SPAM CORRELATION FOUND," or some similar messages conveying similar ideas based upon a reputation score associated with a message. Similarly, the message preview pane 1020 can include a header representation 1040 where a note regarding the reputation or classification can be included in a subject line. It should be understood that a message having a reputation indicating a correlation to known non-spam messages could be labeled similarly based on whether these messages showed strong, weak or indifferent correlations to non-spam messages.

It should be understood that the highlighted message in the inbox pane representation is the message that is displayed in the preview pane. Moreover, it is the highlighted message whose reputation is being displayed to the user. Furthermore, it should be recognized that, in some examples, a messaging filter can reside on a local computer with the messaging client. Moreover, various embodiments of the disclosure may use local input and/or local reputation to refine the local and/or global messaging filters. For example, the user can provide feedback to the local and/or global messaging filters to adjust the classification and/or weighting criteria using, for example, a tuner such as discussed in the present disclosure.

The local input and/or reputation data can also be integrated with the global data residing at multiple reputation servers dispersed geographically and/or logically. The geographical and/or logical dispersion of reputation servers can help to provide better reputation scoring. It should also be understood that local reputation data can be based on a local blacklist or whitelist as well as local action of the user(s). It should be understood that local reputation can help to refine global reputation server information. It should be further understood that the local reputation may differ from the global reputation, and client configuration can establish which reputation will determine the actions to be taken with respect to a particular message or messaging stream.

Further, the client-side representation can be configured by either (or both) user or provider, using local or global data, to provide the reputation for specific IP addresses or other specified locations. The client-side representation can be customized by the provider or by the user for different users' interests. In addition, the client-side representation can be built to work on any end device or client software including, for example, among other; a PC, a handheld, a telephone, a cellular phone, etc. Moreover, the reputation system applying the client side representation may be used to evaluate any IP address or any other entity whose behavior can be assessed and provided using secure communications with that entity.

Figure 13:
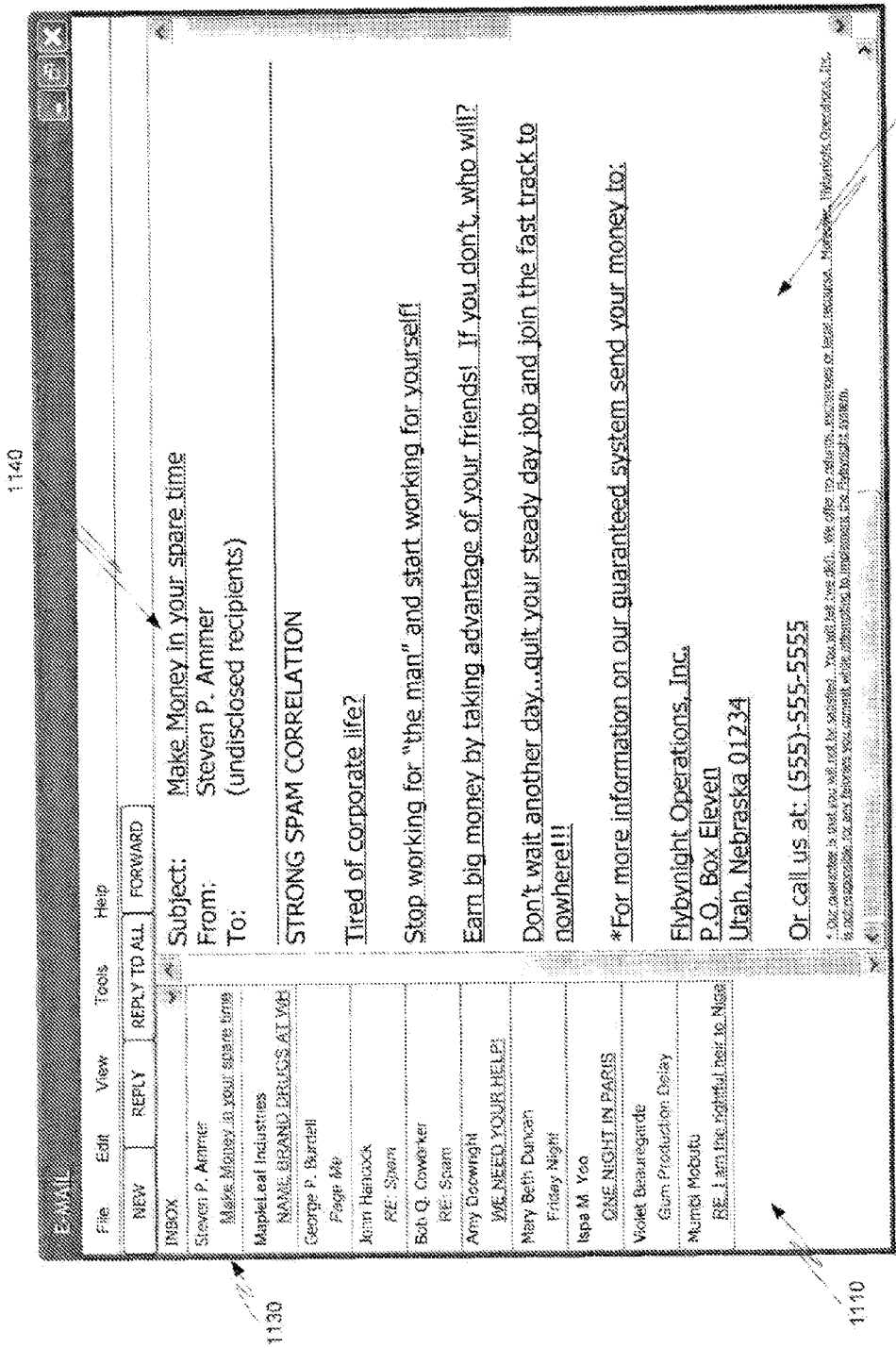

As yet another example, FIG. 13 depicts a messaging client window representation 1100 displaying a message reputation or classification to a user. The messaging client window representation 1100 can include an inbox pane representation 1110 and an optional message preview pane representation 1120. The inbox pane representation 1110 includes a list of messages 1130 associated with an inbox. In this example, formatting can be added to non-plain-text messages. The formatting applied to the message can indicate a reputation or classification of a message to a user. Similarly, the message preview pane 1120 can include a header representation 1140 where the message subject can be formatted to indicate a reputation or classification associated with a message. It should be understood that message correlating to known non-spam message could be formatted based on whether these messages showed strong, weak or indifferent correlations to non-spam messages.

It should be understood that some e-mail clients do not use a preview pane, or allow the user to disable the preview pane. In examples where the preview pane is not used, the reputation can be displayed via a toolbar (described below with respect to FIG. 15). It should be understood that the toolbar can display the reputation of a highlighted message.

Figure 14:
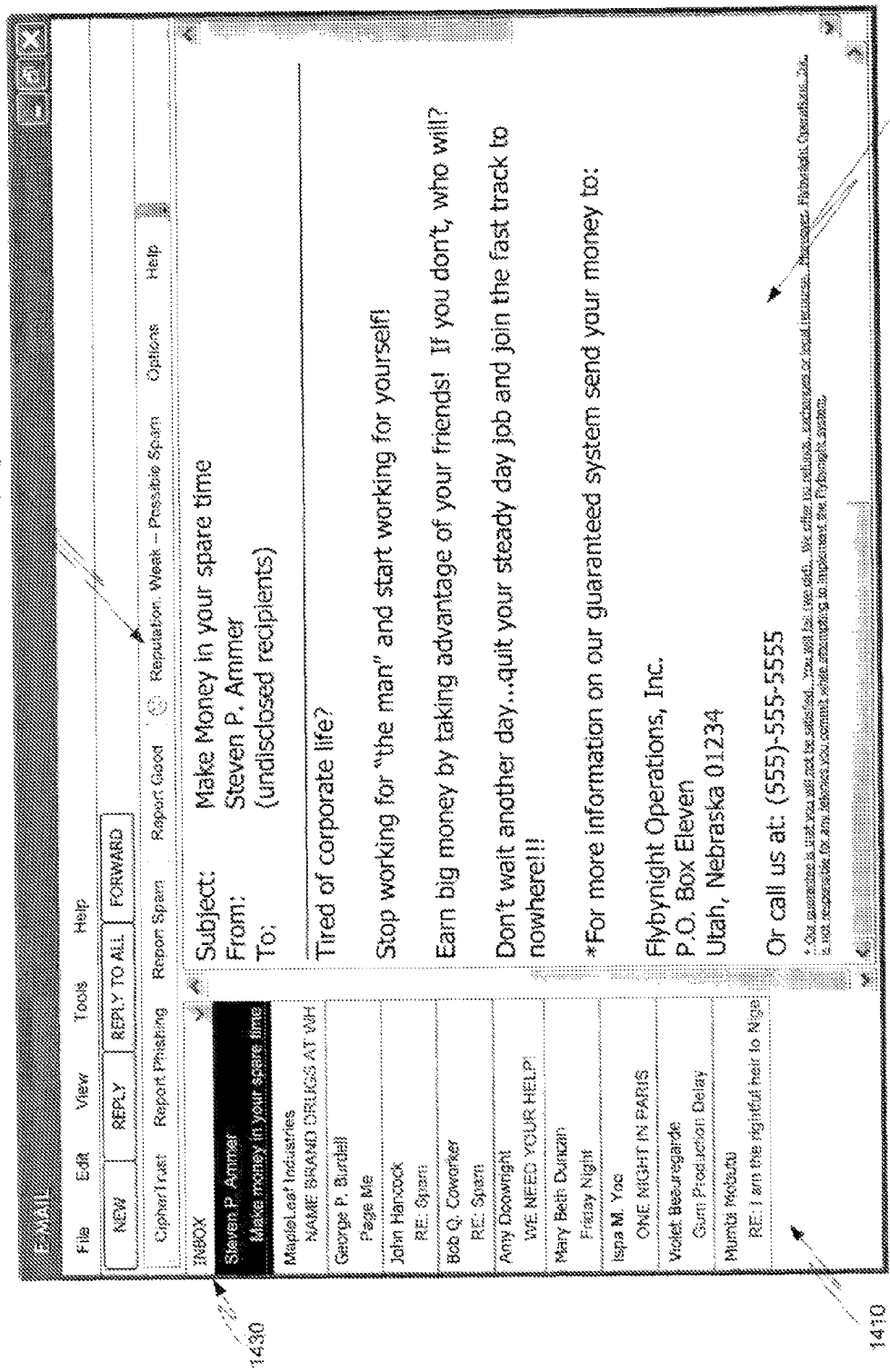
FIG. 14 is a sample screen shot illustration showing an example of a messaging client interface having a toolbar for displaying a messaging reputation to a message recipient.

FIG. 14 shows a messaging client window representation 1400 for displaying a message reputation or classification to a user. The messaging client window representation 1400 includes an inbox pane representation 1410 and a message preview pane representation 1420. The inbox pane representation 1410 includes a list of message 1430 associated with an inbox. In this example, a toolbar representation 1440 is used to display message reputation. Such a toolbar is publicly available from CipherTrust Inc., of Alpharetta, Ga. The toolbar representation 1440 can include a number of button representations to perform various actions. These actions can include, among others, reporting spam, reporting phishing, and reporting a misclassified message. Moreover, the toolbar representation 1440 in this example includes a message reputation indication. As should be understood, there are a variety of different ways to alert a user to a message classification with visual graphics/colors/text sound, or combinations thereof. In this example, a graphic "sad" face is used to notify the user that the message reputation is poor. Further, the graphic in this example is supplemented by a text explanation of the reputation (e.g., "Reputation: Weak—Possible Spam"). Further common inclusions on toolbars representations can include an "Options" button representation and a "Help" button representation. It should be noted, however, that the toolbar representation can be configured in myriad different ways in accordance with this disclosure. As such, this disclosure includes configurations that include as little information as the message reputation, or as much information as desired by the user and/or the programmer.

Figure 15:
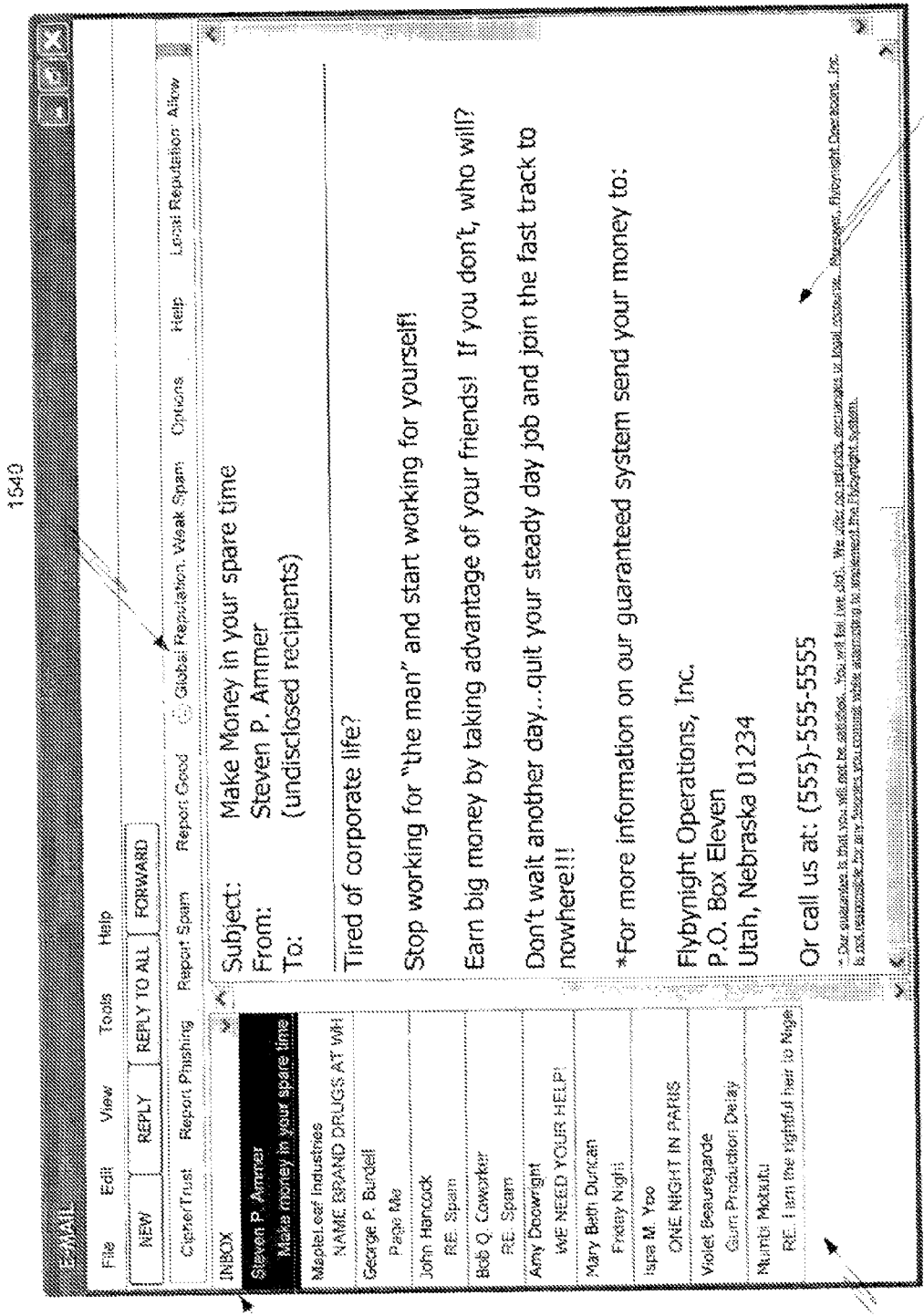
FIG. 15 is a sample screen shot illustration showing an example of a messaging client interface having a toolbar for displaying global and local messaging reputation to a message recipient.

FIG. 15 shows a messaging client window representation 1500 for displaying a message reputation or classification to a user. The messaging client window representation 1500 includes an inbox pane representation 1510 and a message preview pane representation 1520. The inbox pane representation 1510 includes a list of message 1530 associated with an inbox. In this example, a toolbar representation 1540 is used to display message reputation. Such a toolbar is publicly available from CipherTrust Inc., of Alpharetta, Ga. The toolbar representation can include a number of button representations as described with respect to FIG. 14. It should be noted, however, that the toolbar can be configured in myriad different ways, and that the present disclosure is not intended to be limited to only the configuration disclosed. As such, this disclosure includes configurations that include as little information as the message reputation, or as much information as desired by the user and/or the programmer. As an example of the wide scope of this disclosure, the toolbar representation 1540 includes a local reputation representation. It should be understood that the local reputation of an message may be different than the global reputation of a message. For example, a user could add a known spammer to their whitelist because they are interested in the product advertised by the spammer, whereas the global reputation of the message is that the message is spam. As such, the local reputation of the message may provide useful information to the message recipient.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeable unless the context clearly dictates otherwise; the phrase "exclusive or" may be used to indicate situation where only the disjunctive meaning may apply.

A number of embodiments of the invention have been described. Nevertheless, it will be understood that various modifications may be made without departing from the spirit and scope of the invention. Accordingly, other embodiments are within the scope of the following claims.

What is claimed is:

1. A method for providing a reputation associated with a message to an end user, wherein the end user comprises a messaging client, the method implemented at a filtering system and comprising:
    receiving a message, the message being generated by a message originator, and being received from an originating messaging system via a network, the message including a message header comprising originator and recipient information, and a message body comprising content;
    retrieving reputation information for the message based on the originating messaging system or originating information associated with the message;
    associating a reputation indicator with the message, the reputation indicator being based upon the retrieved reputation information; and
    passing the message, along with the associated reputation indicator, to a receiving system associated with a recipient of the message based upon the recipient information included in the message header;
    wherein:
        the reputation associated with the message is operable to be displayed to the recipient;
        the reputation includes a global reputation and a local reputation, the local reputation associated with a user and the global reputation being associated with a plurality of users;
        the reputation indicator causes a recipient device to display the reputation of the message in a toolbar on the recipient device, the displaying including displaying of the global reputation and the local reputation for the message in the toolbar; and
        the local reputation and the global reputation are stored in separate data structures on a remote server, and a user configuration determines which reputation to display in the toolbar.

2. The method of claim 1, wherein the message comprises a messaging stream.

3. The method of claim 1, wherein the reputation information is based upon information about the message originator stored in a local data store.

4. The method of claim 3, wherein the reputation information is based upon information about the message originator stored in a remote data store.

5. The method of claim 1, wherein the reputation information is based upon a combination and analysis of local information and remote information.

6. The method of claim 1, wherein the reputation indicator includes modifying a font associated with the message to alert the recipient to the reputation information associated with the message.

7. The method of claim 6, wherein the reputation indicator includes modifying the font by changing the color associated with one or more of the message header or message body.

8. The method of claim 1, further comprising scoring the message based upon a plurality of tests, the tests being configured to compare the message content to previously received messages, wherein the previously received messages include content associated with a known classification, and wherein reputation information comprises the message score.

9. The method of claim 8, wherein the reputation indicator includes modifying a header associated with the message based upon the score associated with the message.

10. The method of claim 8, the scoring comprising:
  using a plurality of message classification techniques to classify the communication; and
  combining outputs of the message classification techniques to generate a message profile score;
  wherein the message profile score is used in decoding what action is to be taken with respect to the message.

11. The method of claim 1, wherein the message is an e-mail, SMS, an instant messaging, a VoIP, a hypertext transfer protocol, or a file transfer protocol communication.

12. The method of claim 1, wherein the message reputation is displayed using a graphical notation, a text notation, an audio notation, or combinations thereof.

13. The method of claim 12, wherein the graphical notation comprises a representation for a bad reputation, a representation for a good reputation or a representation for an undetermined reputation.

14. The method of claim 1, wherein the recipient device allows the recipient to update a local or global, whitelist or blacklist via the toolbar, wherein the local whitelist or blacklist is maintained by a local client, and wherein the global whitelist or blacklist is stored on a server and is updated with information collected from a plurality of sensor devices.

15. The method of claim 1, wherein the local client receives configuration information from a user, and is operable to override a global reputation based on a local whitelist or blacklist and the configuration information.

16. The method of claim 1, wherein the local reputation is shared with a server storing the global reputation, and the server uses the local reputation as a criterion for adjusting the global reputation.

17. The method of claim 1, further comprising:
  receiving feedback from the user regarding the classification of the message;
  using the feedback to update reputation information in at least one of a global reputation system or a local reputation system.

18. The method of claim 17, wherein the feedback is used to update reputation information only for the user providing the feedback.

19. The method of claim 17, wherein the feedback is used to update reputation information for a plurality of users, including the user that provided the feedback.

20. The method of claim 1, further comprising:
  determining the originator of the message by inspecting the header, wherein the header includes a plurality of intermediate internet protocol address corresponding to a plurality of nodes through which the message was transferred; and
  selecting one of the internet protocol address contained in the header using an origination algorithm.

21. The method of claim 20, wherein the origination algorithm comprises selecting an internet protocol address associated with the last node the message was transferred across before entering a gateway associated with the recipient.

22. A system configured to provide a reputation associated with a message to an end user, wherein the end user comprises a messaging client device, the system comprising:
  a messaging client device configured to receive a message, along with a reputation for the message, from a reputation assignment module configured to assign a reputation to a message, the messaging client device including a computer memory;
  a graphical or audio user interface module stored in the computer memory and coupled to the reputation assignment module by data signals and configured to display to a recipient of the message a graphical or audio representation indicating the reputation associated with the message;
  wherein the reputation of a message is derived based upon a score assigned to the message based upon a plurality of tests, the tests being configured to compare the message content to previously received messages, wherein the previously received messages include content associated with a known classification, and wherein reputation comprises the message score; and
  the reputation associated with the message is operable to be displayed to the recipient by the messaging client device;
  the reputation specifies a global reputation and a local reputation, the local reputation associated with a user and the global reputation being associated with a plurality of users;
  the messaging client device displays the reputation of the message in a toolbar, the displaying including displaying both the global reputation and the local reputation for the message in the toolbar; and
  the local reputation and the global reputation are stored in separate data structures on a remote server, and a user configuration determines which reputation to display in the toolbar.

23. The system of claim 22, wherein the reputation is based upon an IP address associated with the originating information.

24. The system of claim 22, further comprising: a message scoring module configured to generate a score associated with a message to identify how closely the message matches any previously received messages having a known classification.

25. The system of claim 24, wherein the message scoring module is located remotely from the recipient on a reputation server associated with a messaging server, and the message scoring module classifies a plurality of messages passing through the messaging server, the messages being sent to a plurality of recipients.

26. The system of claim 24, wherein the message scoring module is located on a local computer associated with the recipient of the message, and the message scoring module only classifies messages intended for the recipient.

27. The system of claim 22, further comprising:
  receiving feedback from the recipient regarding the classification of the message; and
  using the feedback to adjust message scoring of the reputation assignment module.

28. The system of claim 27, wherein the feedback is received by a central reputation system and is used to adjust the global reputation of the characteristics associated with the message.

29. The system of claim 28, further comprising a plurality of reputation servers configured to retrieve the reputation information retained by the central reputation system to score messages transmitted via messaging servers associated with the reputation servers.

30. The system of claim 26, wherein the feedback is used to adjust the local reputation of the characteristics associated with the message.

31. The method of claim 1, wherein associating a reputation indicator with the message comprises modifying the message.

\* \* \* \* \*

UNITED STATES PATENT AND TRADEMARK OFFICE
CERTIFICATE OF CORRECTION

| | | |
|---|---|---|
| PATENT NO. | : 7,870,203 B2 | Page 1 of 1 |
| APPLICATION NO. | : 11/423329 | |
| DATED | : January 11, 2011 | |
| INVENTOR(S) | : Paul Judge | |

It is certified that error appears in the above-identified patent and that said Letters Patent is hereby corrected as shown below:

On page 1 of Specification, Column 1, Line 18, please delete "be" and insert -- by --, therefor.

Signed and Sealed this
Twenty-ninth Day of March, 2011

David J. Kappos
*Director of the United States Patent and Trademark Office*